United States Patent
Shao et al.

(10) Patent No.: US 12,113,218 B2
(45) Date of Patent: Oct. 8, 2024

(54) LITHIUM-ION BATTERY NEGATIVE ELECTRODE ACTIVE MATERIAL, LITHIUM-ION BATTERY NEGATIVE ELECTRODE, LITHIUM ION BATTERY, BATTERY PACK AND BATTERY-POWERED VEHICLE

(71) Applicant: Hunan Jinye High-tech Co., Ltd., Changsha (CN)

(72) Inventors: Jianrong Shao, Changsha (CN); Qiang Sun, Changsha (CN); Hongdong Wang, Changsha (CN); Junxiang Zhang, Changsha (CN); Liufeng Zhang, Changsha (CN); Jie Tang, Changsha (CN)

(73) Assignee: HUNAN JINYE HIGH-TECH CO., LTD., Changsha (CN)

( * ) Notice: Subject to any disclaimer, the term of this patent is extended or adjusted under 35 U.S.C. 154(b) by 733 days.

(21) Appl. No.: 17/284,276

(22) PCT Filed: Sep. 25, 2019

(86) PCT No.: PCT/CN2019/107752
§ 371 (c)(1),
(2) Date: Apr. 9, 2021

(87) PCT Pub. No.: WO2020/073803
PCT Pub. Date: Apr. 16, 2020

(65) Prior Publication Data
US 2021/0391577 A1    Dec. 16, 2021

(30) Foreign Application Priority Data

Oct. 10, 2018  (CN) .......................... 201811180348.8
Oct. 10, 2018  (CN) .......................... 201811180350.5

(51) Int. Cl.
*H01M 4/583*    (2010.01)
*H01M 4/62*     (2006.01)
(Continued)

(52) U.S. Cl.
CPC ........... *H01M 4/583* (2013.01); *H01M 4/623* (2013.01); *H01M 4/625* (2013.01); *H01M 10/0525* (2013.01); *H01M 2004/021* (2013.01)

(58) Field of Classification Search
CPC ......... B82Y 30/00; B82Y 40/00; C01B 32/15; C01B 32/05; H01M 2004/021;
(Continued)

(56) References Cited

U.S. PATENT DOCUMENTS

| | | | |
|---|---|---|---|
| 2003/0113636 A1* | 6/2003 | Sano | H01M 10/0525 429/340 |
| 2009/0196816 A1* | 8/2009 | Yamamoto | C01B 32/20 423/448 |
| 2015/0349331 A1 | 12/2015 | Yamanoi et al. | |
| 2015/0357637 A1 | 12/2015 | Yamanoi et al. | |
| 2018/0287207 A1 | 10/2018 | Dai et al. | |
| 2019/0010057 A1* | 1/2019 | Shin | H01M 4/587 |

FOREIGN PATENT DOCUMENTS

| | | |
|---|---|---|
| CN | 1702893 A | 11/2005 |
| CN | 1907848 A | 2/2007 |

(Continued)

OTHER PUBLICATIONS

Barrett, E. P., et al. "The Determination of Pore Volume and Area Distributions in Porous Substances. I. Computations from Nitrogen Isotherms" (1951) J. Am. Chem. Soc. 73(1): 373-380.

*Primary Examiner* — Brian R Ohara
*Assistant Examiner* — Brent C Thomas
(74) *Attorney, Agent, or Firm* — Volpe Koenig

(57) ABSTRACT

The present invention relates to negative electrode carbon materials for lithium-ion batteries, and particularly to a lithium-ion battery negative electrode active material, a lithium-ion battery negative electrode, a lithium-ion battery, a battery pack and a battery-powered vehicle. In a pore structure, measured by $N_2$ adsorption and desorption, of the lithium-ion battery negative electrode carbon particles, by using the total pore volume measured by BJH having a pore size of 2-200 nm as the reference, the sum of the volumes of pores with a pore size of 2-10 nm is 2-10%, the sum of the volumes of pores with a pore size of 10-100 nm is (Continued)

30-65%, and the sum of the volumes of pores with a pore size of 100-200 nm is 30-65%, and the carbon particles have a BET specific surface area of 0.9-1.9 m²/g.

16 Claims, 2 Drawing Sheets

(51) Int. Cl.
    *H01M 10/0525*   (2010.01)
    *H01M 4/02*   (2006.01)
(58) Field of Classification Search
    CPC ...... H01M 4/133; H01M 4/583; H01M 4/587; H01M 4/625
    See application file for complete search history.

(56) References Cited

FOREIGN PATENT DOCUMENTS

| | | |
|---|---|---|
| CN | 101531359 A | 9/2009 |
| CN | 101924209 A | 12/2010 |
| CN | 102186771 A | 9/2011 |
| CN | 102557009 A | 7/2012 |
| CN | 102600798 A | 7/2012 |
| CN | 102849718 A | 1/2013 |
| CN | 103155065 A | 6/2013 |
| CN | 103441305 A | 12/2013 |
| CN | 107519880 A | 12/2017 |
| CN | 107799771 A | 3/2018 |
| CN | 107814383 A | 3/2018 |
| EP | 2194599 A1 | 6/2010 |
| JP | 2003-123754 A | 4/2003 |
| JP | 2009-231234 A | 10/2009 |
| JP | 2010-114206 A | 5/2010 |
| JP | 2010-205846 A | 9/2010 |
| JP | 2011258348 A | 12/2011 |
| JP | 2013161835 A | 8/2013 |
| JP | 2014089887 A | 5/2014 |
| JP | 2014170724 A | 9/2014 |
| JP | 2016152223 A | 8/2016 |
| JP | 2018147672 A | 9/2018 |
| KR | 20070026786 A | 3/2007 |
| KR | 101309241 B1 | 9/2013 |
| WO | 2017022486 A1 | 2/2017 |

* cited by examiner

LITHIUM-ION BATTERY NEGATIVE ELECTRODE ACTIVE MATERIAL, LITHIUM-ION BATTERY NEGATIVE ELECTRODE, LITHIUM ION BATTERY, BATTERY PACK AND BATTERY-POWERED VEHICLE

INCORPORATION OF RELATED APPLICATIONS

This application is a 35 USC § 371 national stage of international application No. PCT/CN2019/107752, which is entitled "LITHIUM-ION BATTERY NEGATIVE ELECTRODE ACTIVE MATERIAL, LITHIUM-ION BATTERY NEGATIVE ELECTRODE, LITHIUM ION BATTERY, BATTERY PACK AND BATTERY-POWERED VEHICLE," was filed Sep. 25, 2019, and claims priority to Chinese Application Nos. 201811180348.8, filed on Oct. 10, 2018, and 201811180350.5, filed on Oct. 10, 2018, all of which are incorporated herein by reference as if fully set forth.

FIELD

The present disclosure relates to the technical field of anode carbon materials for lithium-ion battery, and particularly relates to a lithium-ion battery anode active material, a lithium-ion battery anode, a lithium-ion battery, a battery pack, and a battery powered vehicle.

BACKGROUND

Lithium-ion battery has been the hot topic of recent research on new energy resources due to its higher theoretical specific capacity, longer cycle life, high safety and other advantages. During charging and discharging process of a lithium-ion battery, $Li^+$ ions embed and de-embed back and forth between the cathode and the anode. Therefore, the choice of the anode material plays a crucial role for the capacity of lithium-ion battery. At present, the lithium-ion anode materials are mainly selected from the carbon materials, silicon materials and metal or alloy materials, wherein the carbon materials have readily available raw materials, possess high theoretical capacity, and provide sufficient lithium storage space, thus the currently commercialized lithium-ion batteries prefer carbon materials as the anode of the lithium-ion batteries.

The carbon material of the lithium-ion battery anode is generally selected from the group consisting of natural graphite, artificial graphite, mesocarbon microbead, petroleum coke and the like. The natural graphite has the advantages such as a larger specific surface area and a lower delithiation potential, but it has the defects that a first irreversible capacity is large, and it is prone to cause side reactions. The coating, shape-correction process or graphitization treatment is generally used for increasing sphericity degree of the carbon material.

At present, the anode material used for the lithium-ion battery mainly serves to improve sphericity degree and regularity degree of graphite particles, although the carbon materials prepared with the aforementioned methods have an increased capacity during the initial charging and discharging period of the lithium ion batteries, their discharge capacities will be decreased correspondingly after increasing the rate performance.

SUMMARY

The present disclosure aims to provide a lithium-ion battery anode active material, a lithium-ion battery anode, a lithium-ion battery, a battery pack and a battery powered vehicle. The battery anode active material is provided with abundant pore structure, and its use in a lithium-ion battery can greatly improve the discharge capacity and rate performance of the lithium-ion battery, and it is also conducive to improve the low-temperature performance of the lithium-ion battery.

In order to fulfill the above purposes, a first aspect of the present disclosure provides a lithium-ion battery anode carbon particulate and the corresponding preparation method thereof, wherein in the pore structure measured by $N_2$ adsorption and desorption of the carbon particulate, the ratio of the total pore volumes of the pore diameters of 2-10 nm is 5-10%, the ratio of the total pore volumes of the pore diameters of 10-100 nm is 50-65%, and the ratio of the total pore volumes of the pore diameters of 100-200 nm is 30-40%, based on the total pore volume measured by BJH of the pore diameters of 2-200 nm; the carbon particulate has a BET specific surface area within a range of 1-4 $m^2/g$, preferably 1.4-1.9 $m^2/g$.

The first lithium-ion battery anode carbon particulate has pores with a pore diameter of 2-200 nm, the ratio of the total pore volumes of the pore diameters of 10-100 nm accounts for 50-65%. The carbon particulate has a BET specific surface area measured by $N_2$ adsorption and desorption within a range of 1-4 $m^2/g$, and a ratio $I_D/I_G$ measured by Raman being <0.1. When the carbon particulate having the aforementioned structure is used in the lithium-ion battery anode, its abundant pores provide a large amount of lithium storage spaces, in combination with the graphite structure having different crystallinity degree and the specific surface area, such that the lithium-ions in a solvent may sufficiently contact with the carbon particulate, the pore structures of the carbon particulate are stable, and the lithium-ion battery has a high first discharge capacity, a higher discharge rate and excellent low-temperature performance.

In a second aspect, the present disclosure provides a second lithium-ion battery anode carbon particulate and a corresponding preparation method thereof, wherein in the pore structure measured by $N_2$ adsorption and desorption of the carbon particulate, the ratio of the total pore volumes of the pore diameters of 2-10 nm is 2-6%, the ratio of the total pore volumes of the pore diameters of 10-100 nm is 30-45%, and the ratio of the total pore volumes of the pore diameters of 100-200 nm is 50-65%, based on the total pore volume measured by BJH of the pore diameters of 2-200 nm; the carbon particulate has a BET specific surface area within a range of 0.9-2 $m^2/g$, preferably 0.9-1.3 $m^2/g$.

The second lithium-ion battery anode carbon particulate has pores with a pore diameter of 2-200 nm, the ratio of the total pore volumes of the pore diameters of 100-200 nm accounts for 50-65%. The carbon particulate has a BET specific surface area measured by $N_2$ adsorption and desorption within a range of 0.9-2 $m^2/g$, and a ratio $I_D/I_G$ measured by Raman being ≥0.1. The lithium-ion battery anode carbon particulate of the present disclosure has abundant pore structures, when the carbon particulate is used in the lithium-ion battery, the battery has a higher discharge capacity, and can maintain the comparatively reasonable discharge rate and coulombic efficiency.

The third aspect of the present disclosure provides a lithium-ion battery anode comprising the first lithium-ion battery anode carbon particulate of the first aspect and the second lithium-ion battery anode carbon particulate.

The fourth aspect of the present disclosure provides a lithium-ion battery comprising the lithium-ion battery anode of the third aspect, a cathode and an electrolyte, wherein the cathode and the anode are separated by a separator; the cathode, the anode and the separator are immersed in the electrolyte.

The fifth aspect of the present disclosure provides a battery pack, which is composed of one or more lithium-ion batteries of the fourth aspect connected in series and/or in parallel.

The sixth aspect of the present disclosure provides a battery powered vehicle comprising the battery pack of the fifth aspect.

DETAILED DESCRIPTION

Figure 1:
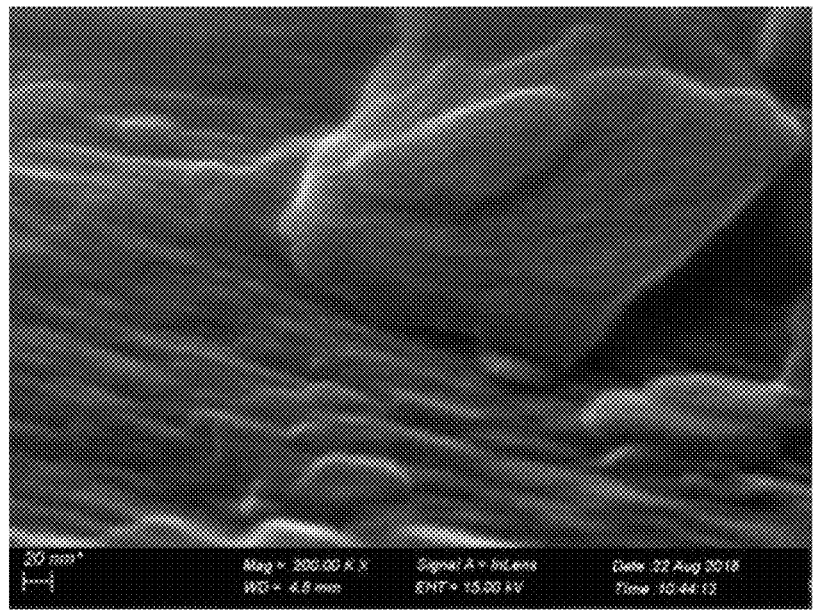
FIG. 1 illustrates an appearance of carbon particulate SC1 in Example 1 of the first preferred embodiment.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides lithium-ion battery anode carbon particulate, wherein in pore structure measured by $N_2$ adsorption and desorption of the carbon particulate, the ratio of the total pore volumes of the pore diameters of 2-10 nm is 5-10%, the ratio of the total pore volumes of the pore diameters of 10-100 nm is 50-65%, and the ratio of the total pore volumes of the pore diameters of 100-200 nm is 30-40%, based on the total pore volume measured by BJH of the pore diameters of 2-200 nm; the carbon particulate has a BET specific surface area within a range of 1-4 $m^2/g$.

In the present disclosure, the term "the ratio of the total pore volumes" refers to a ratio of the pore volumes of any one pore diameter of 2-200 nm relative to the total pore volume of the pore diameter of 2-200 nm.

The present disclosure optimizes the pore distribution of the carbon particulate, such that the prepared carbon particulate has a wide pore size distribution range, and particularly, compared with the existing materials, the pore volume ratio of the pore diameters of 2-10 nm is more than 50% based on the total pore volume of the pore diameters of 2-200 nm. The inventors of the present disclosure have discovered that the pore diameter of the carbon particulate is within a range of 2-200 nm, it is more beneficial to intercalation and de-intercalation of the solvated $Li^+$ ions, provide a larger lithium storage space, and the carbon particulate has a longer reversible discharge platform.

The pores with the pore diameter of 2-10 nm are favorable for storing lithium, and the pores with the pore diameter of 100-200 nm are convenient for the intercalation and de-intercalation of the lithium ions. Under the circumstance that their pore size range and the specific surface area range are identical, as can be seen from the comparison of materials having different ratios of pore size distribution, an use of the carbon particulate having the pores with the pore diameter ratio distribution of the present application as the anode material can effectively realize the balance of the discharge capacity and the rate of the battery, and have higher rate performance and discharge capacity, as well as more excellent low-temperature performance than other comparative materials.

In order to further increase the lithium storage space of the carbon particulate, it is preferable that the carbon particulate has a BET specific surface area within a range of 1.4-1.9 $m^2/g$. More preferably, the BET specific surface area of the carbon particulate is within a range of 1.61-1.85 $m^2/g$.

In order to reduce possibility of reacting the carbon particulate with the electrolyte and improve conductivity of the carbon particulate, it is preferable that the carbon particulate has an interlayer spacing d(002) measured by X-ray diffraction being 0.3368 nm or less, a crystallite size Lc in a C-axis direction within a range of 0.5-0.9 nm, and a graphitization degree of 84-93%.

The carbon particulate in the above range of the crystallite size and the graphitization degree provide abundant interlayer lithium storage space for lithium-ions, has a stable structure and better conductivity, thereby improving the rate performance of the lithium-ion battery.

Preferably, the carbon particulate has a ratio of $I_{(002)}/I_{(100)}$ measured by X-ray diffraction within a range of 180-300, a ratio of $I_{(002)}/I_{(101)}$ within a range of 120-240, a ratio of $I_{(002)}/I_{(004)}$ within a range of 25-35, and a ratio of $I_{(004)}/I_{(110)}$ within a range of 4-10.

The carbon particulate satisfying the above conditions have superior crystallization performance, such that structural collapse caused by relative slippage of interlayer structures in the carbon particulate can be avoided, the orientation can be alleviated, and the cycle performance of the carbon particulate is improved.

For the sake of further improving the structural stability of the carbon particulate, the carbon particulate has a D peak measured by Raman within a range of 1,300-1,400 $cm^{-1}$, preferably 1,300-1,350 $cm^{-1}$, and a G peak within a range of 1,550-1,600 $cm^{-1}$; $I_D/I_G$<0.1.

Preferably, the $I_D/I_G$ is within a range of 0.01-0.084.

More preferably, $I_D/I_G$ is within a range of 0.05-0.066.

The carbon particulate prepared in the present disclosure has regular graphite lamellar structures, and also has structures such as defects and vacancy, the structures are in synergy with the pore distribution of the carbon particulate, so that the discharge capacity, the rate performance and the cycle performance of the lithium-ion battery can be greatly improved when the carbon particulate is used as the lithium-ion battery anode.

In order to further increase the contact area between the carbon particulate and the electrolyte, it is preferable that the carbon particulate has a granularity distribution D10 within a range of 1-5 μm, D50 within a range of 12-18 μm, D90 within a range of 25-35 μm, and a maximum particle diameter of 39 μm.

The particle sizes of the carbon particulate of the present disclosure are distributed according to the aforementioned ranges, the macroscopic size distribution range of the carbon particulate is relatively wide, the immersion property between the carbon particulate and the electrolyte is stronger, so that solvated $Li^+$ can sufficiently contact with the carbon particulate, thereby increasing the lithium storage capacity of the carbon particulate, and effectively improving the low-temperature performance of the lithium-ion battery.

The carbon particulate has a mass loss of 80-90 wt % under the temperature 400-650° C. when subjecting to a thermogravimetric test.

The carbon particulate has a tap density within a range of 0.9-1.2 g/cm$^3$.

The carbon particulate has a powder compaction density within a range of 1.51-1.55 g/cm$^3$.

The tap density of the carbon particulate is within the aforementioned range, it allows an existence of a certain void ratio among the particles, so as to expedite movement of ions in the electrolyte among electrodes, and enhance the charge and discharge performance of the lithium-ion battery.

Another aspect of the present disclosure provides a preparation method of the lithium-ion battery anode carbon particulate, wherein the preparation method comprises the steps of subjecting a carbon source to mechanical pulverization, chemical purification, carbonization and graphitization process sequentially to produce the carbon particulate.

After the carbon source is treated by the above steps, the impurity removal rate of the raw materials is high, the fixed carbon content is 99.972% after the chemical purification, carbonization and graphitization treatment; and the carbon particulate prepared with the method is used in the lithium-ion battery, so that the discharge capacity and rate performance of the lithium-ion battery can be effectively improved.

For the sake of further purifying the carbon source, it is preferable that the carbon source after mechanical pulverization has a particle size D50 within a range of 10-18 μm.

In order to reduce the silicate and metal oxide content of the carbon source, it is preferable that the chemical purification is performed by means of rinsing with HF and/or HCl, more preferably, the chemical purification is performed by means of rinsing with HF and an optional HCl.

According to the present disclosure, the chemical purification may be carried out by means of rinsing with HF and HCl, in this way, it is preferable that the carbon source is initially treated with HF and subsequently treated with HCl. The volume ratio of the carbon source relative to HF/HCl is 1:(1.2-12), wherein the volume concentration of HF is 2-8%, the treatment time is 40-80 min; the volume concentration of HCl is 10-20%, and the treatment time is 20-50 min.

According to the present disclosure, the chemical purification can also be carried out by means of rinsing with HF, in which the volume ratio of the carbon source relative to HF is 1:(1-2), and the volume concentration of HF is within a range of 20-40%.

The carbon source is treated by the above method, so that the carbon particulate with wider pore size distribution can be prepared, and the subsequent step of pore size regulation and control is not needed. Particularly, the particle size D50 of the carbon source pulverized in the earlier stage is within a range of 10-18 μm, and in combination with the chemical purification process that the carbon source is treated by rinsing with HF and/or HCl, such a treatment mode not only can remove the impurities such as sulfide in the carbon source, but also control that the carbon structure in the carbon source is complete, it is conducive to the subsequent carbonization and graphitization treatments.

In order to obtain carbon particulate having a suitable specific surface area and pore size distribution, it is preferable that the carbonization process comprises a temperature rise process of raising the temperature from room temperature to 1,500° C.

For the sake of further improving the structural stability of the carbon particulate, it is preferable that the carbonization process comprises 3-6 temperature rise stages, the heating rate in each temperature rise stage is 1-5° C./min, and a heat preservation stage is arranged between the temperature rise stages.

The present disclosure adopts a carbonization mode of multi-stage heating, wherein the carbon source forms abundant pore distribution by adjusting the heating rate and the temperature rise time, thus the sufficient lithium storage space is provided for Li$^+$ ions in the solution. If the heating rate is too fast, the diversified pore structures cannot be easily formed, and the pore distribution is relatively unitary. If the heating rate is too slow, the adjacent pores are prone to melt and merge, and the formed pore size distribution range is narrow.

In order to further improve the structural stability of the carbon particulate, it is preferable that the graphitization process comprises a temperature rise process from room temperature to 2,900-3,200° C.

Preferably, a multi-stage heating mode is adopted for the graphitization treatment, and the graphitization process specifically comprises three temperature rise stages: a first temperature rise stage is heating from room temperature to 1,350-1,450° C. with a heating rate r1 satisfying the condition of 3≤r1≤6° C./min; a second temperature rise stage is raising temperature to 1,980-2,020° C. with a heating rate r2 satisfying the condition of 2<r2≤3° C./min; a third temperature rise stage is further raising temperature to 2,900-3,200° C. with a heating rate r3 satisfying the condition of 2<r3≤3° C./min; and a heat preservation stage for a time period of 20-30 min is provided between the three temperature rise stages.

The carbonized carbon material is further subjected to a graphitization treatment, the present disclosure adopts a multi-stage heating mode according to the aforementioned heating rates to perform the graphitization treatment process, and the graphitization degree of the carbon material is further improved by regulating and controlling the heating rate and the temperature rise time, thereby providing a larger lithium storage space.

Wherein the carbon source may be at least one selected from the group consisting of foundry coke, metallurgical coke, coal, artificial graphite and natural graphite. When the method of the present disclosure is used for preparing the carbon particulate, a single carbon source can be selected, or a plurality of carbon sources may be selected to match with each other. The present disclosure preferably adopts foundry coke as the carbon source, which not only improves the additional value of the foundry coke and benefits formation of the pores having a pore diameter within a range of 2-200 nm, but also can prepare the anode material suitable for the lithium-ion battery.

Another aspect of the present disclosure provides a lithium-ion battery anode carbon particulate, wherein in the pore structure measured by N$_2$ adsorption and desorption of the carbon particulate, the ratio of the total pore volumes of the pore diameters of 2-10 nm is 2-6%, the ratio of the total pore volumes of the pore diameters of 10-100 nm is 30-45%, and the ratio of the total pore volumes of the pore diameters of 100-200 nm is 50-65%, based on the total pore volume measured by BJH of the pore diameters of 2-200 nm; the carbon particulate has a BET specific surface area within a range of 0.9-2 m$^2$/g.

In the present disclosure, the term "the ratio of the total pore volumes" refers to a ratio of the pore volumes of any one pore diameter of 2-200 nm relative to the total pore volume of the pore diameter of 2-200 nm.

The present disclosure optimizes the pore distribution of the carbon particulate, such that the prepared carbon particulate has a wide pore size distribution range, and particularly, compared with the existing materials, the pore volume ratio of the pore size between 100 nm and 200 nm is more than 50%, the pore volume ratio of the pore size between 2 nm and 10 nm is 5-10 vol %, based on the total pore volume of the pore diameters of 2-200 nm. The pore diameter of the carbon particulate of the present disclosure is within a range of 2-200 nm, it can improve the lithium storage space, and the carbon particulate has a longer reversible discharge platform. Under the circumstance that their pore size range and the specific surface area range are identical, as can be seen from the comparison of materials having different ratios of pore size distribution, an use of the carbon particulate having the pores with the pore diameter ratio distribution of the present application as the anode material can effectively realize the balance of the discharge capacity and the rate of the battery, the battery has a high discharge capacity, and obtain a balance between the reasonable coulombic efficiency and rate performance.

For the sake of further increasing the lithium storage space of the carbon particulate, it is preferable that the carbon particulate has a BET specific surface area within a range of 0.9-1.3 m$^2$/g. Further preferably, the BET specific surface area of the carbon particulate is within a range of 0.98-1.28 m$^2$/g.

In order to reduce the possibility of reacting the carbon particulate with the electrolyte and improve conductivity of the carbon particulate, it is preferable that the carbon particulate has an interlayer spacing d(002) measured by X-ray diffraction being 0.3368 nm or less, a crystallite size Lc in a C-axis direction within a range of 0.5-0.9 nm, and a graphitization degree of 84-93%.

The carbon particulate prepared in the present disclosure has a high graphitization degree, the carbon particulate within the aforementioned ranges provide interlayer lithium storage space for lithium-ions, it has a stable structure and better conductivity, thereby improving the rate performance of the lithium-ion battery.

Preferably, the carbon particulate has a ratio of $I_{(002)}/I_{(100)}$ measured by X-ray diffraction within a range of 180-300, a ratio of $I_{(002)}/I_{(101)}$ within a range of 120-240, a ratio of $I_{(002)}/I_{(004)}$ within a range of 25-35, and a ratio of $I_{(004)}/I_{(110)}$ within a range of 4-10.

The carbon particulate satisfying the above conditions have superior crystallization performance, such that structural collapse caused by relative slippage of interlayer structures in the carbon particulate can be avoided, the orientation can be alleviated, and the cycle performance of the carbon particulate is improved.

For the sake of further improving the structural stability of the carbon particulate, the carbon particulate has a D peak measured by Raman within a range of 1,300-1,400 cm$^{-1}$, preferably 1,300-1,350 cm$^{-1}$, and a G peak within a range of 1,550-1,600 cm$^{-1}$; $I_D/I_G \geq 0.1$, preferably 0.1-0.4, more preferably 0.1-0.2.

The carbon particulate prepared in the present disclosure has regular graphite lamellar structures, and also has structures such as defects and vacancy, the structures are in synergy with the pore distribution of the carbon particulate, so that the discharge capacity and the coulombic efficiency of the lithium-ion battery can be greatly improved when the carbon particulate is used as the lithium-ion battery anode.

In order to further increase the contact area between the carbon particulate and the electrolyte, it is preferable that the carbon particulate has a granularity distribution D10 within a range of 1-5 μm, D50 within a range of 12-18 μm, D90 within a range of 25-35 μm, and a maximum particle diameter of 39 μm.

The particle sizes of the carbon particulate of the present disclosure are distributed according to the aforementioned ranges, the macroscopic size distribution range of the carbon particulate is relatively wide, the immersion property between the carbon particulate and the electrolyte is stronger, so that solvated Li$^+$ can sufficiently contact with the carbon particulate, thereby increasing the lithium storage capacity of the carbon particulate, the size distribution are in synergy with the microscopic pore the of the carbon particulate, which can further effectively increasing capacity of a lithium-ion battery.

The carbon particulate has a mass loss of 80-90 wt % under the temperature 400-650° C. when subjecting to a thermogravimetric test.

The carbon particulate has a tap density within a range of 0.9-1.2 g/cm$^3$.

The carbon particulate has a powder compaction density within a range of 1.61-2.05 g/cm$^3$.

The tap density of the carbon particulate is within the aforementioned range, it allows an existence of a certain void ratio among the particles, so as to expedite movement of ions in the electrolyte among electrodes, and enhance the charge and discharge performance of the lithium-ion battery.

Another aspect of the present disclosure provides a preparation method of the lithium-ion battery anode carbon particulate, wherein the preparation method comprises the steps of subjecting a carbon source to mechanical pulverization, chemical purification, carbonization and graphitization process sequentially to produce the carbon particulate.

After the carbon source is treated by the above steps, the impurity removal rate of the raw materials is high, the fixed carbon content is 99.972% after the chemical purification, carbonization and graphitization treatment, so that the discharge capacity of the lithium-ion battery can be effectively improved.

For the sake of further purifying the carbon source, it is preferable that the carbon source after mechanical pulverization has a particle size D50 within a range of 10-18 μm.

In order to reduce the silicate and metal oxide content of the carbon source, it is preferable that the chemical purification is performed by means of rinsing with HF and/or HCl, more preferably, the chemical purification is performed by means of rinsing with HF and an optional HCl.

According to the present disclosure, the chemical purification can be carried out by means of rinsing with HF and HCl, in this way, it is preferable that the carbon source is initially treated with HF and subsequently treated with HCl. The volume ratio of the carbon source relative to HF/HCl is 1:(1.2-12), wherein the volume concentration of HF is 2-8%, the treatment time is 40-80 min; the volume concentration of HCl is 10-20%, and the treatment time is 20-50 min.

According to the present disclosure, the chemical purification can also be carried out by means of rinsing with HF, in which the volume ratio of the carbon source relative to HF is 1:(1-2), and the volume concentration of HF is within a range of 20-40%.

The carbon source is treated by the above method, so that the carbon particulate with wider pore size distribution can be prepared, and the subsequent step of pore size regulation and control is not needed. Particularly, the particle size D50 of the carbon source pulverized in the earlier stage is within a range of 10-18 μm, and in combination with the chemical purification process that the carbon source is treated by rinsing with HF and/or HCl, such a treatment mode not only can remove the impurities such as sulfide in the carbon source, but also control that the carbon structure in the carbon source is complete, it is conducive to the subsequent carbonization and graphitization treatments.

In order to obtain carbon particulate having a suitable specific surface area and pore size distribution, it is preferable that the carbonization process comprises a temperature rise process of raising the temperature from room temperature to 1,500° C.

For the sake of further improving the structural stability of the carbon particulate, it is preferable that the carbonization process comprises a plurality of temperature rise stages, preferably 3-6 temperature rise stages, the heating rate in each temperature rise stage is 2-5° C./min, and a heat preservation stage is arranged between the temperature rise stages.

The present disclosure adopts a carbonization mode of multi-stage heating, wherein the carbon source forms abundant pore distribution by adjusting the heating rate and the temperature rise time, thus the sufficient lithium storage space is provided for $Li^+$ ions in the solution. If the heating rate is too fast, the diversified pore structures cannot be easily formed, and the pore distribution is relatively unitary. If the heating rate is too slow, the adjacent pores are prone to melt and merge, and the formed pore size distribution range is narrow. By adopting the process, the pores with the pore diameter of 100-200 nm accounts for a large portion in the pores with the pore diameter of 2-200 nm.

In order to further improve the structural stability of the carbon particulate, it is preferable that the graphitization process comprises a temperature rise process from room temperature to 2,900-3,200° C.

Preferably, a multi-stage heating mode is adopted for the graphitization treatment, and the graphitization process specifically comprises three temperature rise stages: a first temperature rise stage is heating from room temperature to 1,350-1,450° C. with a heating rate of 3-6° C./min; a second temperature rise stage is raising temperature to 1,980-2,020° C. with a heating rate of 0.5-2° C./min; a third temperature rise stage is further raising temperature to 2,900-3,200° C. with a heating rate of 0.5-2° C./min; and a heat preservation stage for a time period of 20-30 min is provided between the three temperature rise stages.

The carbonized carbon material is further subjected to a graphitization treatment, the present disclosure adopts a multi-stage heating mode according to the aforementioned heating rates to perform the graphitization treatment process, and the graphitization degree of the carbon material is further improved by regulating and controlling the heating rate and the temperature rise time, thereby providing a larger lithium storage space.

Wherein the carbon source may be at least one selected from the group consisting of foundry coke, metallurgical coke, coal, artificial graphite and natural graphite. When the method of the present disclosure is used for preparing the carbon particulate, a single carbon source can be selected, or a plurality of carbon sources may be selected to match with each other. The present disclosure preferably adopts foundry coke as the carbon source, which not only improves the additional value of the foundry coke, but also can prepare the anode material suitable for the lithium-ion battery.

Another aspect of the present disclosure provides a lithium-ion battery anode comprising the lithium-ion battery anode carbon particulate of the first aspect; the lithium-ion battery anode further comprises an aqueous binder, a weight ratio of the carbon particulate to the aqueous binder is 1:0.01-0.06.

The binder within the aforementioned ratio range does not affect the structure and conductivity of the carbon material, and facilitates sufficient contact between the carbon particulate and the electrolyte.

In order to further improve conductivity of the lithium-ion battery anode, it is preferable that the lithium-ion battery anode further comprises a conductive agent, a weight ratio of the carbon particulate to the conductive agent is 1:0.05-0.125.

Under such a condition, the conductive agent can promote the conductivity performance of the whole lithium-ion battery anode, and it does not influence the structure of carbon particulate.

Wherein the conductive agent is at least one selected from the group consisting of conductive carbon black, graphite, graphene and carbon nanotube. The binder is at least one selected from the group consisting of polyvinylidene fluoride, carboxylic butadiene-styrene latex, styrene-butadiene rubber, polyvinyl alcohol, sodium carboxymethylcellulose and polytetrafluoroethylene.

The lithium-ion battery anode prepared with the carbon particulate of the present disclosure has desirable conductivity and large lithium storage space, and can effectively improve discharge capacity, coulombic efficiency and high-temperature performance of the lithium-ion battery. The button cell prepared with the carbon particulate has a charge capacity of 365-371.6 mAh/g, a discharge capacity of 358-367 mAh/g and a coulomb efficiency within a range of 92-95%.

Another aspect of the present disclosure provides a lithium-ion battery comprising the lithium-ion battery anode of the third aspect, a cathode and an electrolyte, wherein the cathode and the anode are separated by a separator; the cathode, the anode and the separator are immersed in the electrolyte.

In order to enable the lithium-ion battery to have high capacity and desirable cycle stability, the active material used by the cathode is at least one selected from the group consisting of lithium, nickel, a nickel-cobalt binary metal, a nickel-cobalt-manganese ternary metal, a nickel-cobalt-aluminum ternary metal, lithium iron phosphate, lithium manganate and lithium cobaltate.

For the sake of promoting rapid movement of the ions in the electrolyte of the lithium-ion battery between the cathode and the anode, it is preferable that the material of the separator is selected from polyethylene and/or polypropylene. The electrolyte is at least one selected from the group consisting of ethylene carbonate, propylene carbonate, diethyl carbonate, dimethyl carbonate, ethyl methyl carbonate and lithium hexafluorophosphate.

The lithium-ion battery anode prepared by the present disclosure is assembled into the 18650 full battery, the grain capacity of the full battery is within a range of 353-359 mAh/g, and the discharge capacity retention rate of the lithium-ion battery cathode at 1 C rate is 98.0%.

Another aspect of the present disclosure provides a battery pack comprising one or more lithium-ion batteries of the fourth aspect connected in series and/or in parallel.

Another aspect of the present disclosure provides a battery powered vehicle including the battery pack of the fifth aspect.

The lithium-ion batteries of the present disclosure can be connected in series and/or in parallel, that is, the lithium-ion batteries can be assembled to form a battery pack with higher capacity and excellent high-temperature performance, and the battery pack may be applied on the battery powered vehicles.

The present disclosure will be described in detail with reference to examples. In the following Examples, The apparent morphology of the carbon particulate was tested by a scanning electron microscope;

The energy spectrum analysis was performed on the carbon particulate by using a transmission electron microscope, wherein a copper mesh is used as a substrate;

A V-sorb 2800P specific surface area and pore size analyzer was used for testing the BET specific surface area of the carbon particulate measured by $N_2$ adsorption and desorption, and the distribution condition of the pore volume between 2 and 200 nm was analyzed using a BJH.

The ratio of pore volume in the present disclosure were obtained from the partial volume of the pore volume illustrated in a BJH adsorption-pore diameter distribution curve diagram, the ratio of pore volume of the pores having a pore size between a1 and a2=the total volume of the pore volume of the pores having a pore size between a1 and a2/the total volume of the pore volume of the pores having a pore size within a range of 2-200 nm×100%, wherein a1 and a2 are respectively the pore width in the unit of nm, and a1<a2.

The X-Ray diffraction (XRD) crystal face structure of carbon particulate was tested by an X-ray diffractometer, whereby the interlayer spacing d(002), Lc, graphitization degree and the different peak intensity ratios were analyzed. The type of X-ray diffractometer: Da Vinci; manufacturer: BRUCKER AXS GMBH in Germany; specification: 3 kw; scan range: 10° to 90°; scan speed: 12° per minute; test condition: 40 kV/40 mA.

Wherein the interlayer spacing d(002) was calculated according to the formula $\lambda/(2 \sin \theta)$; the graphitization degree was calculated based on the formula $(0.344-d(002))/(0.344-0.3354)\times 100\%$; Lc was calculated as $\lambda/\beta_{002} \cos \theta$; wherein $\lambda$ represented an X-ray wavelength; $\theta$ was the Bragg angle, and $\beta 002$ was the peak width of half of the (002) diffraction peak.

The Raman spectrum of the carbon particulate was measured by a Raman Spectrometer, the positions of the D peak and the G peak thereof were measured, and a ratio of $I_D/I_G$ was calculated.

The granularity distribution of the carbon particulate was tested by the particle size analyzer (manufactured by OMEC Instruments Corporation).

The thermogravimetric curve of the carbon particulate was tested by means of a thermogravimetric analyzer; the test conditions were as follows: the intake rate of $N_2$ is 10 mL/min, the intake rate of Ar is 50 mL/min.

The tap density of the carbon particulate was tested by a tap density instrument, the true density was tested with the Ultrapycnometer 1000.

The raw material specifications and manufacturers referred to in the following Examples are as follows:

The foundry coke Foundry coke was purchased from Shuolong Minerals Processing Plant; the metallurgical coke was purchased from Anyang Yuding Metallurgical Limited Company, Ltd.; the mesophase carbon microspheres were purchased from Anda New Energy Materials Co., Ltd.; the flake graphite was selected 325 mesh graphite powder, which was purchased from Qingdao Risheng Graphite Co., Ltd.; the petroleum coke was purchased from Mingxintai Petrochemical Co., Ltd.;

The HF and polyvinylidene fluoride (PVDF) solution were purchased from Sinopharm Chemical Reagent Co., Ltd.; the conductive carbon black was selected as N220 and purchased from Essel Chemical; the lithium hexafluorophosphate was purchased from Jiangsu Guotai International Group International Trade Co., Ltd.

First Preferred Embodiment

Example 1

1. Preparing the Lithium-Ion Battery Anode Carbon Particulate:

In the present example, foundry coke (SC0) was selected as the carbon source and baked till a moisture content less than 1 wt. %. The carbon source was pulverized until D50 was within a range of 10-18 μm, the carbon source was subjected to purification by using 30 vol % of HF, the carbon source and the HF solution were uniformly mixed according to the volume ratio of 1:1.2, and subjected to stirring for 30 min to form a mixture. After the mixture was separated, the solid was rinsed with deionized water, then separated again, and the solid obtained by separation was subsequently baked for later use.

The baked solid was subjected to a carbonization treatment, the entire carbonization process comprised three temperature rise stages. The first temperature rise stage was heating from the room temperature to 500° C. at a heating rate of 3° C./min and keeping the constant temperature 500° C. for 30 min; the second temperature rise stage was raising temperature to 1,000° C. at a heating rate of 2.5° C./min and keeping the constant temperature 1,000° C. for 20 min; the third temperature rise stage was raising temperature to 1,500° C. at a heating rate of 1.5° C./min and keeping the constant temperature 1,500° C. for 30 min; subsequently cooled to the room temperature.

The carbonized solid was subjected to a graphitization treatment, and the entire graphitization process included three temperature rise stages. The first temperature rise stage was heating to 1,450° C. at a heating rate r1=5° C./min and keeping the constant temperature 1,450° C. for 30 min; the second temperature rise stage was raising temperature to 2,000° C. at a heating rate r2=2.5° C./min and keeping the constant temperature 2,000° C. for 30 min; the third temperature rise stage was further raising temperature to 3,200° C. at a heating rate r3=3° C./min and keeping the constant temperature 3,200° C. for 30 min.

Figure 2:
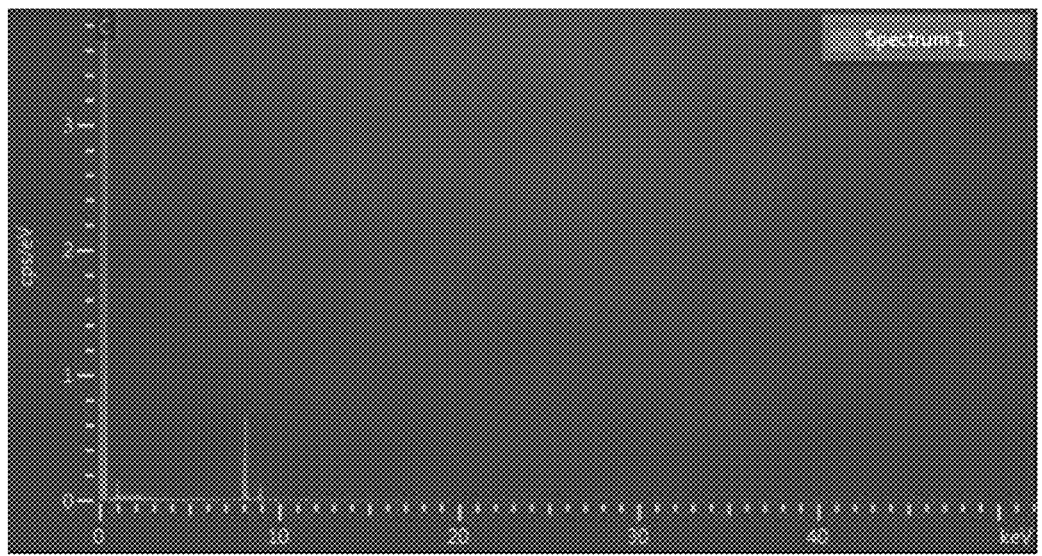
FIG. 2 illustrates an energy spectrogram of the carbon particulate SC1 in Example 1 of the first preferred embodiment.

The graphitized solid was cooled to 2,000° C. at a temperature fall rate of 5° C./min, and then the solid was naturally cooled to room temperature to obtain carbon particulate SC1, wherein the appearance of the carbon particulate SC1 was shown in FIG. 1, the microstructure characteristics of the carbon particulate were illustrated in Table 1, and the energy spectrogram of the carbon particulate was shown in FIG. 2.

2. Preparation of Lithium-Ion Battery Anode

The carbon particulate SC1 obtained in step 1 was used as a battery anode active material, conductive carbon black was used as a conductive agent, and PVDF was used as a binder. The SC1, PVDF and the conductive carbon black were uniformly mixed according to the mass ratio of 8:0.4:0.4 to prepare a slurry. The slurry was uniformly coated on a copper foil having a thickness of 0.02 mm, the coated copper foil was subjected to bake in a vacuum oven for 24 hours, the solvent in the slurry was removed so as to prepare an electrode sheet SD1.

3. Assembly of Button Cell

The electrode sheet SD1 was used as the anode of the button cell and was punched into a circular sheet for further use. The metal lithium with a diameter of 16 mm was used as a cathode, the cathode and the anode were separated by a polyethylene separator, the electrolyte was a mixed solution of lithium hexafluorophosphate which concentration is 1 mol/L and vinylene carbonate which concentration is 1 mol/L, and the volume ratio of the lithium hexafluorophosphate to the vinylene carbonate was 95:5. The battery assembly was operated in a glove box to prepare and form the button cell which was marked as SK1.

The LAND CT 2001 was used for measuring the charge and discharge performance of the button cell SK1 within the voltage range of 0.01-2V vs. Li/Li$^+$, and the discharge specific capacity at the rates of 0.1 C and 2 C.

4. Assembly of a Columnar Battery

A columnar battery was assembled and formed according to the assembly standard of 18650 lithium battery, by using lithium cobaltate as cathode, utilizing the mixture of lithium hexafluorophosphate and ethylene carbonate with the volume ratio of 95:5 as an electrolyte, and using the carbon particulate SC1 as the anode material. The columnar battery was marked as SZ1, the columnar battery were tested in terms of the discharge capacity, coulombic efficiency and discharge specific capacity under an operating voltage of 2-4.2V and respectively at 0.2 C and 0.5 C. The battery was subjected to capacity grading, then placed for 15 days, and then tested for internal resistance and voltage values, and its discharge capacity at 0.5 C, 1 C, 5 C and 10 C.

A columnar battery was assembled according to the assembly standard of 18650 lithium battery by using lithium cobaltate as a cathode, using 1 mol/L LiPF 6-based electrolyte consisting of ethylene carbonate, dimethyl carbonate and methyl ethyl carbonate (the volume ratio was 1:1:1) as an electrolyte, and using the carbon particulate SC1 as an anode material, the columnar battery was assembled by adopting low-temperature electrolyte, under the environment of 20±5° C., the battery was discharges to a voltage of 2.75V at the discharge current of 1,050 mA, the battery was laid aside for 10 min, was then charged at the charging current of 1,050 mA till an end voltage 4.2 v, the battery was shifted to a constant voltage charging process until the charging current was reduced to 21 mA, the charging process was stopped, the battery was laid aside for 30 min. The batteries were laid aside under a testing temperature −20° C. for 7 hours, and then discharged at constant current 1,050 mA till a cutoff voltage of 2.75V, the discharge capacity was recorded.

Example 2

The battery was prepared according to the same method as that in Example 1, except that:

During the process of preparing the lithium-ion battery anode carbon particulate, the baked solid was subjected to carbonization treatment, and the whole carbonization process comprises six temperature rise stages. The first temperature rise stage was heating from room temperature to 200° C. with a heating rate of 4° C./min, and keeping the constant temperature 200° C. for 30 min; the second temperature rise stage was raising temperature to 500° C. at a heating rate of 5° C./min and keeping the constant temperature 500° C. for 30 min; the third temperature rise stage was raising temperature to 800° C. at a heating rate of 5° C./min and keeping the constant temperature 800° C. for 20 min; the fourth temperature rise stage was raising temperature to 1,000° C. at a heating rate of 4° C./min and keeping the constant temperature 1,000° C. for 20 min; the fifth temperature rise stage was raising temperature to 1,200° C. at a heating rate of 4° C./min and keeping the constant temperature 1,200° C. for 20 min; the sixth temperature rise stage was raising temperature to 1,500° C. at a heating rate of 4° C./min and keeping the constant temperature 1,500° C. for 20 min; then naturally cooled to the room temperature.

The carbonized solid was subjected to a graphitization treatment, and the entire graphitization process included three temperature rise stages. The first temperature rise stage was heating to 1,450° C. at a temperature rise rate r1=6° C./min and keeping the constant temperature 1,450° C. for 30 min; the second temperature rise stage was raising temperature to 2,020° C. at a temperature rise rate r2=3° C./min and keeping the constant temperature 2,020° C. for 20 min; the third temperature rise stage was further raising temperature to 2,900° C. at a temperature rise rate r3=2.1° C./min and keeping the constant temperature 2,900° C. for 30 min.

The graphitized solid was subsequently cooled to 2,000° C. at the temperature fall rate of 5° C./min, and then naturally cooled to the room temperature to produce the carbon particulate SC2, the electrode sheet made of SC2 was labeled as SD2, the button cell assembled with SC2 was marked as SK2, and the columnar battery assembled with SC2 was denoted as SZ2.

Example 3

The battery was prepared according to the same method as that in Example 1, except that:

The baked solid was subjected to carbonization treatment, and the whole carbonization process comprises three temperature rise stages. The first temperature rise stage was heating from the room temperature to 500° C. at a temperature rise rate of 3° C./min and keeping the constant temperature 500° C. for 20 min; the second temperature rise stage was raising temperature to 1,000° C. at a temperature rise rate of 3° C./min and keeping the constant temperature 1,000° C. for 30 min; the third temperature rise stage was raising temperature to 1,500° C. at a temperature rise rate of 3° C./min and keeping the constant temperature 1,500° C. for 30 min.

The carbonized solid was subjected to a graphitization treatment, and the entire graphitization process included three temperature rise stages. The first temperature rise stage was heating to 1,350° C. at a temperature rise rate r1=3° C./min and keeping the constant temperature 1,350° C. for 30 min; the second temperature rise stage was raising temperature to 1,980° C. at a temperature rise rate r2=2.8° C./min and keeping the constant temperature 1,980° C. for 20 min; the third temperature rise stage was further raising temperature to 3,200° C. at a temperature rise rate r3=2.5° C./min and keeping the constant temperature 3,200° C. for 30 min.

The graphitized solid was subsequently cooled to 2,000° C. at the temperature fall rate of 5° C./min, and then naturally cooled to the room temperature to produce the carbon particulate SC3, the electrode sheet made of SC3 was labeled as SD3, the button cell assembled with SC3 was marked as SK3, and the columnar battery assembled with SC3 was denoted as SZ3.

Example 4

The battery was prepared according to the same method as that in Example 1, except that the carbonization treatment process in Example 4 is different from that of Example 1 when preparing the lithium-ion battery anode carbon particulate. The first temperature rise stage was heating from the room temperature to 500° C. at a temperature rise rate of 10° C./min and keeping the constant temperature 500° C. for 30 min; the second temperature rise stage was raising temperature to 1,000° C. at a temperature rise rate of 8° C./min and keeping the constant temperature 1,000° C. for 20 min; the third temperature rise stage was raising temperature to 1,500° C. at a temperature rise rate of 5° C./min and keeping the constant temperature 1,500° C. for 30 min.

The carbonized solid was subjected to a graphitization treatment, and the entire graphitization treatment process included three temperature rise stages as follows: the first temperature rise stage was heating to 1,450° C. at a temperature rise rate of 3° C./min and keeping the constant temperature 1,450° C. for 30 min; the second temperature rise stage was raising temperature to 2,020° C. at a temperature rise rate of 2° C./min and keeping the constant temperature 2,020° C. for 20 min; the third temperature rise stage was further raising temperature to 3,200° C. at a temperature rise rate of 1° C./min and keeping the constant temperature 3,200° C. for 30 min.

The carbon particulate produced with the method was finally marked as SC4, the electrode sheet made of SC4 was labeled as SD4, the button cell assembled with SC4 was marked as SK4, and the columnar battery assembled with SC4 was denoted as SZ4.

Example 5

The battery was prepared according to the same method as that in Example 1, except that:

when the lithium-ion battery anode carbon particulate was prepared, the carbonization treatment process comprised the following steps: the temperature was raised from the room temperature to 1,500° C. at the heating rate of 5° C./min, and the constant temperature 500° C., the constant temperature 1,000° C. and the constant temperature 1,500° C. were kept for 30 min, respectively.

The carbonized solid was subjected to a graphitization treatment, and the entire graphitization process included three temperature rise stages. The first temperature rise stage was heating to 1,370° C. at a temperature rise rate r1=8° C./min and keeping the constant temperature 1,370° C. for 30 min; the second temperature rise stage was raising temperature to 2,020° C. at a temperature rise rate r2=8° C./min and keeping the constant temperature 2,020° C. for 30 min; the third temperature rise stage was further raising temperature to 2,950° C. at a temperature rise rate r3=5° C./min and keeping the constant temperature 2,950° C. for 30 min.

The graphitized solid was subsequently cooled to 2,000° C. at the temperature fall rate of 5° C./min, and then naturally cooled to the room temperature to produce the carbon particulate SC5, the electrode sheet made of SC5 was labeled as SD2, the button cell assembled with SC5 was marked as SK5, and the columnar battery assembled with SC5 was denoted as SZ5.

Example 6

The battery was prepared according to the same method as that in Example 1, except that: the carbon source was initially subjected to purification by using 4 vol % of HF solution, the carbon source and the HF solution were uniformly mixed according to the volume ratio of 1:10, and subjected to stirring for 60 min to form a mixture. After the mixture was separated, the solid was subjected to purification with 14 vol % of HCl solution, the solid and the HCl solution were uniformly mixed according to the volume ratio of 1:3, and subjected to stirring for 30 min, then separated, the solid obtained by separation was subsequently baked for later use.

The carbon particulate produced with the method was marked as SC6, the electrode sheet made of SC6 was labeled as SD6, the button cell assembled with SC6 was marked as SK6, and the columnar battery assembled with SC6 was denoted as SZ6.

Comparative Example 1

The battery was prepared according to the same method as that in Example 1, except that the carbonization conditions in Comparative example 1 were different from those of Example 1. In particular, the first temperature rise stage was heating to 500° C. at a temperature rise rate of 15° C./min and keeping the constant temperature 500° C. for 30 min; the second temperature rise stage was raising temperature to 1,000° C. at a temperature rise rate of 10° C./min and keeping the constant temperature 1,000° C. for 20 min; the third temperature rise stage was raising temperature to 1,500° C. at a temperature rise rate of 15° C./min and keeping the constant temperature 1,500° C. for 30 min.

The carbon particulate produced with the method was marked as DC1, the electrode sheet made of DC1 was labeled as DD1, the button cell assembled with DC1 was marked as DK1, and the columnar battery assembled with DC1 was denoted as DZ1.

Comparative Example 2

The battery was prepared according to the same method as that in Example 1, except that the metallurgical coke was selected as a carbon source; the carbon particulate produced with the method was marked as DC2, the electrode sheet made of DC2 was labeled as DD2, the button cell assembled with DC2 was marked as DK2, and the columnar battery assembled with DC2 was denoted as DZ2.

Comparative Example 3

The battery was prepared according to the same method as that in Example 1, except that the mesocarbon microbead was selected as a carbon source; the carbon particulate produced with the method was marked as DC3, the electrode sheet made of DC3 was labeled as DD3, the button cell assembled with DC3 was marked as DK3, and the columnar battery assembled with DC3 was denoted as DZ3.

Comparative Example 4

The battery was prepared according to the same method as that in Example 1, except that the carbon source was prepared according to the following process: the foundry coke was pulverized and spheroidized such that its average particle diameter D50 was 16 μm, then the foundry coke and the petroleum coke were subjected to stirring and blending according to the weight ratio of 9:1 to prepare the carbon source.

The carbon source was subjected to a carbonization treatment, the entire carbonization process comprised heating from the room temperature to 1,100° C. at a heating rate of 3° C./min and keeping the constant temperature 1,100° C. for 60 min; subsequently raising temperature to 1,500° C. at a heating rate of 2.5° C./min and keeping the constant temperature 1,500° C. for 60 min; then cooled to the room temperature to obtain the carbon particulate.

The carbon particulate produced with the method was marked as DC4, the electrode sheet made of DC4 was labeled as DD4, the button cell assembled with DC4 was marked as DK4, and the columnar battery assembled with DC4 was denoted as DZ4.

Comparative Example 5

The battery was prepared according to the same method as that in Example 6, except that:

The carbon source was initially subjected to purification by using 4 vol % of HF solution, the carbon source and the HF solution were uniformly mixed according to the volume ratio of 1:20, and subjected to stirring for 60 min to form a mixture. After the mixture was separated, the solid was subjected to purification with 14 vol % of HCl solution, the solid and the HCl solution were uniformly blended according to the volume ratio of 1:10, and subjected to stirring for 30 min, the solid obtained by separation was subsequently baked for later use.

The carbon particulate produced with the method was marked as DC5, the electrode sheet made of DC5 was labeled as DD5, the button cell assembled with DC5 was marked as DK5, and the columnar battery assembled with DC5 was denoted as DZ5.

Comparative Example 6

The battery was prepared according to the same method as that in Example 1, except that:

The carbon source was subjected to purification by using 15 vol % of HF solution, the carbon source and the HF solution were uniformly mixed according to the volume ratio of 1:1.2, and subjected to stirring for 30 min to form a mixture. After the mixture was separated, the solid was subjected to rinsing with a deionized water, after separation, the solid obtained by separation was subsequently baked for later use.

The carbon particulate produced with the method was marked as DC6, the electrode sheet made of DC6 was labeled as DD6, the button cell assembled with DC6 was marked as DK6, and the columnar battery assembled with DC6 was denoted as DZ6.

Comparative Example 7

The battery was prepared according to the same method as that in Example 1, except that:

The carbonized solid was subjected to a graphitization treatment, and the entire graphitization treatment process included the following steps: heating to 1,900° C. at a temperature rise rate of 10° C./min and keeping the constant temperature 1,900° C. for 20 min; further heating to 2,800° C. at a temperature rise rate of 15° C./min and keeping the constant temperature 2,800° C. for 20 min.

The graphitized solid was cooled to 2,000° C. at a temperature fall rate of 5° C./min, subsequently naturally cooled to the room temperature to produce the carbon particulate DC7, the electrode sheet made of DC7 was labeled as DD7, the button cell assembled with DC7 was marked as DK7, and the columnar battery assembled with DC7 was denoted as DZ7.

The carbon particulates prepared in the above Examples were subjected to structural characterization, and the specific characterization results were shown in Table 1; the carbon particulates prepared in the above Comparative Examples were subjected to structural characterization, and the specific characterization results were shown in Table 1 (continued).

TABLE 1

| Test items | | SC0 | SC1 | SC2 | SC3 | SC4 | SC5 | SC6 |
|---|---|---|---|---|---|---|---|---|
| BET specific surface area (m²/g) | | 24.7 | 1.61 | 1.7 | 1.85 | 1.98 | 1.89 | 1.72 |
| Based on the total pore volume of the pore diameters of 2-200 nm measured by BJH | The ratio of the total pore volumes of the pore diameters of 2-10 nm/% | 38.84 | 6.7 | 9.6 | 8.5 | 5.2 | 9.8 | 9.5 |
| | The ratio of the total pore volumes of the pore diameters of 10-100 nm/% | 47.63 | 59.7 | 53.2 | 60.3 | 64.8 | 50.5 | 58.4 |
| | The ratio of the total pore volumes of the pore diameters of 100-200 nm/% | 13.53 | 33.6 | 37.2 | 31.2 | 30 | 39.7 | 32.1 |
| d(002)/nm | | 0.34 | 0.3359 | 0.336 | 0.3359 | 0.336 | 0.336 | 0.336 |
| Lc/nm | | 1.425 | 0.677 | 0.679 | 0.677 | 0.679 | 0.679 | 0.679 |
| Graphitization degree/% | | 46.5 | 86.1 | 92.2 | 90.5 | 89.8 | 91.3 | 87.4 |
| $I_{(002)}/I_{(100)}$ | | — | 186.5 | 196.4 | 257.4 | 250.5 | 260.5 | 192.4 |
| $I_{(002)}/I_{(101)}$ | | — | 125.1 | 209.2 | 212.6 | 159.4 | 232.7 | 134.5 |
| $I_{(002)}/I_{(004)}$ | | — | 30.7 | 31.4 | 30.2 | 30.9 | 32.5 | 31.2 |
| $I_{(004)}/I_{(110)}$ | | — | 4.98 | 6.87 | 7.86 | 4.78 | 5.25 | 5.14 |
| D peak measured by Raman/cm⁻¹ | | 1317 | 1330 | 1325 | 1349 | 1359 | 1397 | 1328 |
| G peak measured by Raman/cm⁻¹ | | 1592 | 1568 | 1575 | 1583 | 1592 | 1558 | 1573 |
| $I_D/I_G$ | | 0.65 | 0.066 | 0.075 | 0.084 | 0.04 | 0.032 | 0.069 |
| Granularity distribution | D10 | 51.7 | 1.71 | 3.67 | 2.85 | 2.84 | 4.73 | 1.95 |
| | D50 | 270.7 | 15.71 | 14.97 | 15.94 | 12.85 | 17.75 | 16.02 |
| | D90 | 643.4 | 29.18 | 28.41 | 29.67 | 25.1 | 33.7 | 30.5 |
| Thermogravimetric test | Ratio of mass loss under the temperature 400-650° C. relative to the weight % | — | 89.4 | 88.3 | 89.3 | 88.4 | 89.1 | 89.5 |
| Tap density (g/cm³) | | — | 0.905 | 1.15 | 1.2 | 1.18 | 1.15 | 0.92 |

TABLE 1-continued

| Test items | | DC1 | DC2 | DC3 | DC4 | DC5 | DC6 | DC7 |
|---|---|---|---|---|---|---|---|---|
| BET specific surface area (m²/g) | | 2.39 | 5.59 | 1.6 | 1.72 | 1.53 | 1.52 | 1.62 |
| Based on the total pore volume of the pore diameters of 2-200 nm measured by BJH | The ratio of the total pore volumes of the pore diameters of 2-10 nm/% | 3.4 | 1.24 | 2.9 | 1.2 | 16.3 | 15.8 | 36.5 |
| | The ratio of the total pore volumes of the pore diameters of 10-100 nm/% | 46.2 | 20.58 | 32.6 | 9.5 | 62.1 | 19.2 | 29.8 |
| | The ratio of the total pore volumes of the pore diameters of 100-200 nm/% | 50.4 | 78.18 | 64.5 | 89.3 | 21.6 | 65 | 33.7 |
| d(002)/nm | | 0.336 | 0.337 | 0.3357 | — | 0.336 | 0.336 | 0.336 |
| Lc/nm | | 0.679 | 0.682 | — | — | 0.679 | 0.679 | 0.68 |
| Graphitization degree/% | | 94.18 | 81.4 | — | — | 94.18 | 94.18 | 94.18 |
| $I_{(002)}/I_{(100)}$ | | 141.5 | 138.5 | — | — | — | — | — |
| $I_{(002)}/I_{(101)}$ | | 112.1 | 110.9 | — | — | — | — | — |
| $I_{(002)}/I_{(004)}$ | | 36.2 | 37.4 | — | — | — | — | — |
| $I_{(004)}/I_{(110)}$ | | 3.15 | 4.26 | — | — | — | — | — |
| D peak measured by Raman/cm⁻¹ | | 1362 | 1370 | — | — | — | — | — |
| G peak measured by Raman/cm⁻¹ | | 1586 | 1594 | — | — | — | — | — |
| $I_D/I_G$ | | 0.102 | 0.121 | — | — | — | — | — |
| Granularity distribution | D10/μm | 7.92 | 8.21 | 5.12 | 6.73 | 8.7 | 9.2 | 8.2 |
| | D50/μm | 16.12 | 18.35 | 10.5 | 16.94 | 18.73 | 17.62 | 15.6 |
| | D90/μm | 28.49 | 30.47 | 19.6 | 25.8 | 28.7 | 30.5 | 32.4 |
| Thermogravimetric test | Ratio of mass loss under the temperature 400-650° C. relative to the weight % | 88.6 | 89.2 | 89.5 | 87.4 | 79.1 | 85.6 | 88.5 |
| Tap density (g/cm³) | | 1.23 | 1.46 | 0.99 | 1.68 | 1.10 | 1.08 | 1.10 |

The button cells and the columnar batteries prepared in each of the above Examples and Comparative Examples were subjected to performance measurement, and the specific measurement results were illustrated in Table 2.

TABLE 2

| | Test items | SK1 | SK2 | SK3 | SK4 | SK5 | SK6 |
|---|---|---|---|---|---|---|---|
| Button Cell | Charge capacity/mAh·g⁻¹ | 371.6 | 370.5 | 367 | 369.2 | 368 | 365.4 |
| | Discharge capacity/mAh·g⁻¹ | 367 | 366 | 360 | 364 | 364 | 359 |
| | Coulombic efficiency/% | 96.84 | 95.78 | 95.62 | 94.78 | 94.46 | 95.65 |
| | 0.2 C discharge specific capacity mAh·g⁻¹ | 361.5 | 360.5 | 354 | 358 | 358.5 | 353.4 |
| | 1 C specific discharge capacity mAh·g⁻¹ | 356 | 355.1 | 349 | 350 | 353 | 348.3 |
| 18650 columnar battery | 0.2 C discharge capacity/mAh | 2154.3 | 2093 | 2126.8 | 2064 | 2023 | 2034 |
| | 0.5 C discharge capacity/mAh | 2154.7 | 2092.5 | 2126.4 | 2064 | 2021 | 2025 |
| | 0.2 C first coulombic efficiency/% | 96.64 | 95.1 | 94.8 | 94.1 | 94 | 94.7 |
| | Internal resistance of battery/mΩ | 27.1 | 29.3 | 27.8 | 27.5 | 27.8 | 27.5 |
| | Voltage values of battery/V | 4.1 | 4.1 | 4.1 | 4.1 | 4.1 | 4.1 |
| | 1 C discharge capacity/mAh | 2143.5 | 2082 | 2115.7 | 2052.6 | 2010.8 | 2023.3 |
| | 5 C discharge capacity/mAh | 1938.9 | 1883.7 | 1914 | 1857.6 | 1820.7 | 1829 |
| | 10 C discharge capacity/mAh | 1024.3 | 1014.5 | 1121.7 | 1025 | 991.4 | 989.5 |
| Capacity test at −20° C. | Charge capacity under a normal temperature/mAh | 2092.9 | 2015.4 | 1997.6 | 2014.5 | 1991.4 | 1990.7 |
| | Discharge capacity under a low temperature/mAh | 1342 | 1246 | 1154 | 1147 | 1159 | 1152 |

TABLE 2-continued

| | Percentage/% | 64.1 | 61.8 | 57.7 | 56.9 | 58.2 | 57.9 |
|---|---|---|---|---|---|---|---|
| | Test items | DK1 | DK2 | DK3 | DK4 | DK5 | DK6 | DK7 |
| Button Cell | Charge capacity/mAh·g$^{-1}$ | 333.9 | 331.5 | 339.6 | 327.6 | 341.2 | 338.5 | 389.4 |
| | Discharge capacity/mAh·g$^{-1}$ | 316.8 | 311.7 | 317.4 | 307.4 | 315.6 | 312.3 | 355.7 |
| | Coulombic efficiency/% | 94.9 | 94 | 93.4 | 93.8 | 92.5 | 92.3 | 91.3 |
| | 0.1 C discharge specific capacity mAh·g$^{-1}$ | 319.9 | 315.9 | 321.4 | 310.4 | 313.2 | 310.4 | 346.6 |
| | 2 C discharge specific capacity mAh·g$^{-1}$ | 40.5 | 32.7 | 34.4 | 31.2 | 31.9 | 30.6 | 39.5 |
| 18650 columnar battery | 0.2 C discharge capacity/mAh | 2083.1 | 2045.7 | 2064.5 | 2054.1 | 2062 | 2059.1 | 2062.4 |
| | 0.5 C discharge capacity/mAh | 2051.2 | 2086.4 | 2054.7 | 2004.7 | 2027.4 | 2023.5 | 2024.1 |
| | 0.2 C first coulombic efficiency/% | 88.1 | 87.5 | 86.7 | 85.42 | 84.3 | 85.2 | 83.7 |
| | Internal resistance of cell/mΩ | 29.6 | 30.2 | 29.8 | 26.7 | 29.5 | 29.7 | 29.4 |
| | Voltage value of cell/V | 4.1 | 4.1 | 4.1 | 4.1 | 4.1 | 4.1 | 4.1 |
| | 1 C discharge capacity/mAh | 2002.1 | 1992.3 | 2012.5 | 1987.5 | 1954.1 | 1976.4 | 1994.7 |
| | 5 C discharge capacity/mAh | 1942.1 | 1927.8 | 1937.8 | 1912.3 | 1941.7 | 1905.7 | 1942 |
| | 10 C discharge capacity/mAh | 418.6 | 521.4 | 676.5 | 526.7 | 473 | 485 | 509 |
| Capacity test at −20° C. | Charge capacity under a normal temperature/mAh | 2031.5 | 2027.6 | 2016.8 | 2008.4 | 1987.5 | 1992.4 | 2007.4 |
| | Discharge capacity under a low temperature/mAh | 978 | 1096 | 1103 | 986 | 1054 | 1034 | 984 |
| | Percentage/% | 48.1 | 54 | 54.7 | 49.1 | 53 | 51.9 | 49 |

As illustrated by the data in Table 1 and Table 2, the carbon particulate of the first preferred embodiment prepared with the method of the present disclosure has a specific surface area within a range of 1.61-1.98 m²/g, and the pores having the pore diameters of 2-10 nm account for more than 50% of the total pore volume of the pore diameters of 2-200 nm. When the carbon particulates prepared in each of the Example are assembled into a button cell, the button cell has a charge capacity within a range of 365-371.6 mAh/g and a discharge capacity within a range of 358-367 mAh/g; in addition, the columnar battery formed by assembling of the carbon particulate has the discharge capacity at 5 C rate which can still be kept at 1,912-1,943 mAh, and the discharge capacity at 10 C rate can be kept at 989-1,025 mAh. The discharge capacity at the low temperature of −20° C. can be maintained within a range of 1,147-1,342 mAh.

As shown in the Comparative Example 5 and the Comparative Example 7, the discharge capacities of the button cells prepared therein at both 5 C and 10 C rates were slightly reduced when the total pore volumes of 2-10 nm pores accounts for nearly 50% of the total pore volume of the pore diameters of 2-200 nm. As demonstrated in the Comparative Example 6, when the total pore volumes of 2-10 nm pores accounts for a small portion of the total pore volume of the pore diameters of 2-200 nm, both the rate performance and the low-temperature property of the button cells produced with the carbon particulate are degraded. As shown in the Comparative Examples 1-4, when the carbonization rate is increased or other raw material is used as the carbon source, the rate performance and low-temperature property of the prepared lithium-ion battery are slightly degraded. Therefore, when the carbon particulate in the first preferred embodiment prepared with the method of the present disclosure is used as the lithium-ion battery anode, the charge capacity, discharge capacity and rate performance of the lithium-ion battery can be effectively improved.

Second Preferred Embodiment

Example A1

1. Preparing the Lithium-Ion Battery Anode Carbon Particulate:

In the present example, foundry coke (SC0) was selected as the carbon source and baked till a moisture content less than 1 wt. %. The carbon source was pulverized until D50 was within a range of 5-18 μm, the carbon source was subjected to purification by using 30 vol % of HF, the carbon source and the HF solution were uniformly mixed according to the volume ratio of 1:1.2, and subjected to stirring for 30 min to form a mixture. After the mixture was separated, the solid was rinsed with deionized water, then separated again, and the solid obtained by separation was subsequently baked for later use.

The baked solid was subjected to a carbonization treatment, the entire carbonization process comprised three temperature rise stages. The first temperature rise stage was heating from the room temperature to 500° C. at a heating rate of 5° C./min and keeping the constant temperature 500°

C. for 20 min; the second temperature rise stage was raising temperature to 1,000° C. at a heating rate of 5° C./min and keeping the constant temperature 1,000° C. for 30 min; the third temperature rise stage was raising temperature to 1,500° C. at a heating rate of 3° C./min and keeping the constant temperature 1,500° C. for 30 min; then naturally cooled to the room temperature.

The carbonized solid was subjected to a graphitization treatment, and the entire graphitization process included three temperature rise stages. The first temperature rise stage was heating to 1,350° C. at a heating rate r1=6° C./min and keeping the constant temperature 1,350° C. for 20 min; the second temperature rise stage was raising temperature to 2,020° C. at a heating rate r2=2° C./min and keeping the constant temperature 2,020° C. for 20 min; the third temperature rise stage was further raising temperature to 3,000° C. at a heating rate r3=2° C./min and keeping the constant temperature 3,000° C. for 30 min.

Figure 3:
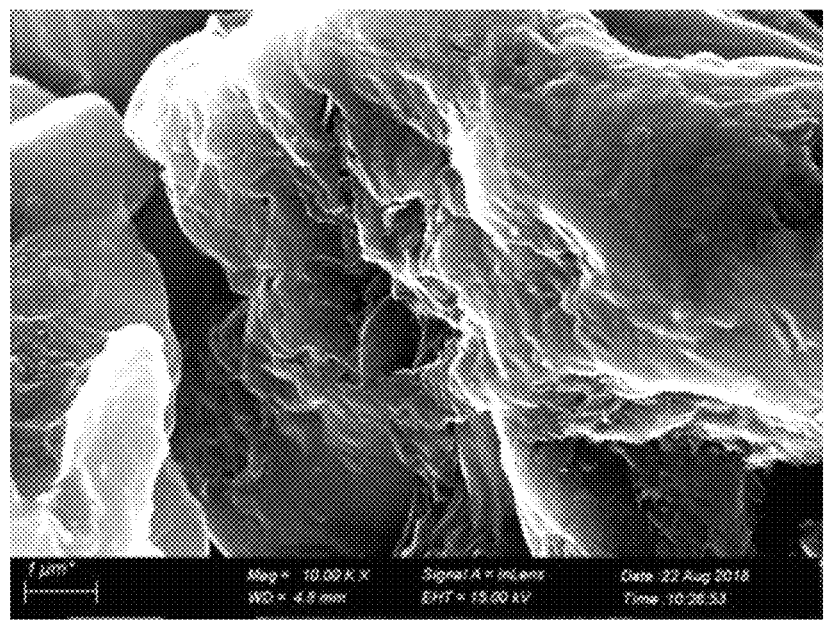
FIG. 3 illustrates an appearance of carbon particulate SC1 in Example A1 of the second preferred embodiment.
Figure 4:
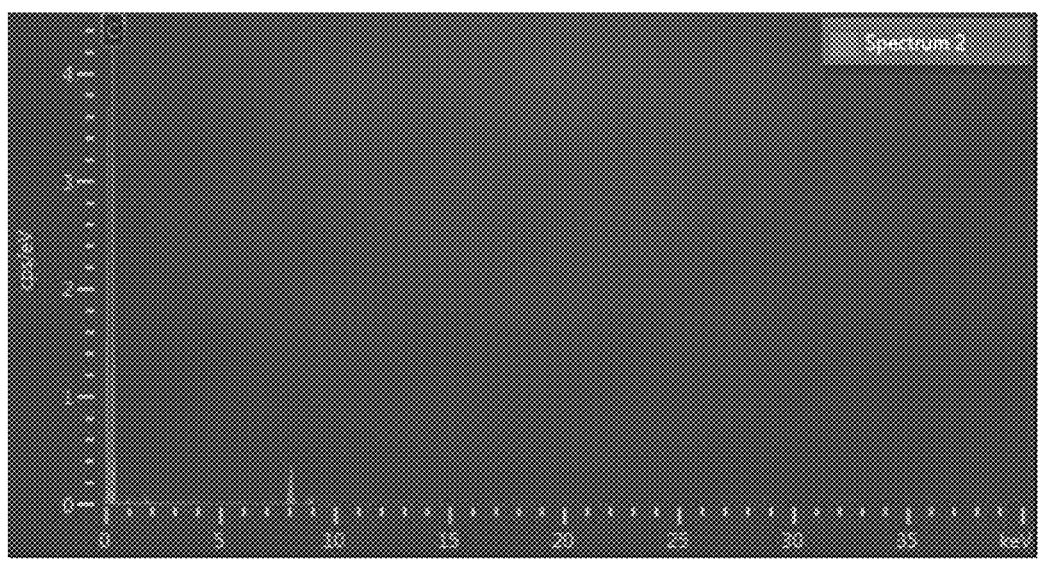
FIG. 4 illustrates an energy spectrogram of carbon particulate SC1 in Example A1 of the second preferred embodiment.

The graphitized solid was cooled to 2,000° C. at a temperature fall rate of 5° C./min, and then the solid was naturally cooled to room temperature to obtain carbon particulate ASC1, wherein the appearance of the carbon particulate ASC1 was shown in FIG. 3, the microstructure characteristics of the carbon particulate were illustrated in Table 3, and the energy spectrogram of the carbon particulate was shown in FIG. 4.

2. Preparation of Lithium-Ion Battery Anode

The carbon particulate ASC1 obtained in step 1 was used as a battery anode active material, conductive carbon black was used as a conductive agent, and PVDF was used as a binder. The ASC1, PVDF and the conductive carbon black were uniformly mixed according to the mass ratio of 8:0.4:0.4 to prepare a slurry. The slurry was uniformly coated on a copper foil having a thickness of 0.02 mm, the coated copper foil was subjected to baking in a vacuum oven for 24 hours, the solvent in the slurry was removed so as to prepare an electrode sheet ASD1.

3. Assembly of Button Cell

The electrode sheet ASD1 was used as the anode of the button cell and was punched into a circular sheet 10 mm for further use. The metal lithium with a diameter of 16 mm was used as a cathode, the cathode and the anode were separated by a polyethylene separator, the electrolyte was a mixed solution consisting of lithium hexafluorophosphate which concentration is 1 mol/L and vinylene carbonate which concentration is 1 mol/L, and the volume ratio of the lithium hexafluorophosphate to the vinylene carbonate was 95:5. The battery assembly was operated in a glove box to prepare and form the button cell which was marked as ASK1.

The LAND CT 2001 was used for measuring the charge and discharge performance of the button cell ASK1 within the voltage range of 0.01-2V vs. Li/Li$^+$, and the discharge specific capacity at the rates of 0.1 C and 2 C.

4. Assembly of a Columnar Battery

A columnar battery was assembled and formed according to the assembly standard of 18650 lithium battery, by using lithium cobaltate as cathode, utilizing the mixture of lithium hexafluorophosphate and ethylene carbonate with the volume ratio of 95:5 as an electrolyte, and using the carbon particulate ASC1 as the anode material. The columnar battery was marked as ASZ1, the columnar battery were tested in terms of the discharge capacity, coulombic efficiency and discharge specific capacity under an operating voltage of 2-4.2V and at 0.2 C, respectively. The battery was subjected to capacity grading, then placed for 15 days, and then tested for internal resistance and voltage values, and its discharge capacity at 0.5 C and 1 C rates.

The battery was discharges to a voltage of 2.75V at the discharge current of 1,050 mA under the environment of 20±5° C., the battery was laid aside for 10 min, was then charged at the charging current of 1,050 mA till an end voltage 4.2 v, the battery was shifted to a constant voltage charging process until the charging current was reduced to 21 mA, the charging process was stopped, the battery was laid aside for 30 min. The batteries were laid aside under a testing temperature 60° C. for 7 hours, and then discharged at constant current 1,050 mA till a cutoff voltage of 2.75V, the discharge capacity was recorded.

Example A2

The battery was prepared according to the same method as that in Example A1, except that:

The carbonization treatment process in Example A2 is different from that in Example A1 during the process of preparing the lithium-ion battery anode carbon particulate. In particular, the first temperature rise stage was heating from room temperature to 200° C. with a heating rate of 5° C./min, and keeping the constant temperature 200° C. for 10 min; the second temperature rise stage was raising temperature from 200° C. to 500° C. at a heating rate of 5° C./min and keeping the constant temperature 500° C. for 20 min; the third temperature rise stage was raising temperature from 500° C. to 800° C. at a heating rate of 3° C./min and keeping the constant temperature 800° C. for 15 min; the fourth temperature rise stage was raising temperature from 800° C. to 1,000° C. at a heating rate of 3° C./min and keeping the constant temperature 1,000° C. for 15 min; the fifth temperature rise stage was raising temperature from 1,000° C. to 1,200° C. at a heating rate of 3° C./min and keeping the constant temperature 1,200° C. for 10 min; the sixth temperature rise stage was raising temperature from 1,200° C. to 1,500° C. at a heating rate of 3° C./min and keeping the constant temperature 1,500° C. for 30 min.

The carbonized solid was subjected to a graphitization treatment, and the entire graphitization process included three temperature rise stages. The first temperature rise stage was heating to 1,350° C. at a temperature rise rate of 3° C./min and keeping the constant temperature 1,350° C. for 20 min; the second temperature rise stage was raising temperature to 1,980° C. at a temperature rise rate of 2° C./min and keeping the constant temperature 1,980° C. for 20 min; the third temperature rise stage was further raising temperature to 3,000° C. at a temperature rise rate of 0.7° C./min and keeping the constant temperature 3,000° C. for 20 min.

The graphitized solid was subsequently cooled to 2,000° C. at the temperature fall rate of 5° C./min, and then naturally cooled to the room temperature to produce the carbon particulate ASC2, the electrode sheet made of ASC2 was labeled as ASD2, the button cell assembled with SC2 was marked as ASK2, and the columnar battery assembled with ASC2 was denoted as ASZ2.

Example A3

The battery was prepared according to the same method as that in Example A1, except that:

The graphitization treatment process in Example A3 is different from that in Example A1 during the process of preparing the lithium-ion battery anode carbon particulate. The specific graphitization treatment process was as follows: the first temperature rise stage was heating from room temperature to 1,350° C. at a temperature rise rate of 3°

C./min and keeping the constant temperature 1,350° C. for 30 min; the second temperature rise stage was raising temperature to 2,000° C. at a temperature rise rate of 2° C./min and keeping the constant temperature 2,000° C. for 30 min; the third temperature rise stage was further raising temperature to 3,000° C. at a temperature rise rate of 1.5° C./min and keeping the constant temperature 3,000° C. for 20 min. The graphitized solid was subsequently cooled to 2,000° C. at the temperature fall rate of 5° C./min, and then naturally cooled to the room temperature.

The graphitized solid was subsequently cooled to 2,000° C. at the temperature fall rate of 5° C./min, and then naturally cooled to the room temperature to produce the carbon particulate ASC3, the electrode sheet made of ASC3 was labeled as ASD3, the button cell assembled with ASC3 was marked as ASK3, and the columnar battery assembled with ASC3 was denoted as ASZ3.

Example A4

The battery was prepared according to the same method as that in Example A1, except that The carbonization treatment process in Example A4 is different from that of Example A1 when preparing the lithium-ion battery anode carbon particulate. The first temperature rise stage was heating to 500° C. at a temperature rise rate of 10° C./min and keeping the constant temperature 500° C. for 20 min; the second temperature rise stage was raising temperature to 1,000° C. at a temperature rise rate of 8° C./min and keeping the constant temperature 1,000° C. for 30 min; the third temperature rise stage was raising temperature to 1,500° C. at a temperature rise rate of 6° C./min and keeping the constant temperature 1,500° C. for 30 min. Subsequently, the carbon source was naturally cooled to the room temperature.

The carbonized solid was subjected to a graphitization treatment, and the entire graphitization treatment process included three temperature rise stages as follows: the first temperature rise stage was heating from room temperature to 1,450° C. at a temperature rise rate of 6° C./min and keeping the constant temperature 1,450° C. for 30 min; the second temperature rise stage was raising temperature to 2,000° C. at a temperature rise rate of 1° C./min and keeping the constant temperature 2,000° C. for 20 min; the third temperature rise stage was further raising temperature to 3,200° C. at a temperature rise rate of 2° C./min and keeping the constant temperature 3,200° C. for 20 min.

The carbon particulate produced with the method was finally marked as ASC4, the electrode sheet made of ASC4 was labeled as ASD4, the button cell assembled with ASC4 was marked as ASK4, and the columnar battery assembled with ASC4 was denoted as ASZ4.

Example A5

The battery was prepared according to the same method as that in Example A1, except that:

when the lithium-ion battery anode carbon particulate was prepared, the carbonization treatment process comprised the following steps: the temperature was raised from the room temperature to 1,500° C. at the heating rate of 5° C./min, and the constant temperature 500° C., the constant temperature 1,000° C. and the constant temperature 1,500° C. were kept for 30 min, respectively. The carbon source was then naturally cooled to room temperature.

The carbonized solid was subjected to a graphitization treatment, and the entire graphitization process included three temperature rise stages. The first temperature rise stage was heating from room temperature to 1,400° C. at a temperature rise rate of 8° C./min and keeping the constant temperature 1,400° C. for 20 min; the second temperature rise stage was raising temperature to 2,000° C. at a temperature rise rate of 8° C./min and keeping the constant temperature 2,000° C. for 20 min; the third temperature rise stage was further raising temperature to 3,000° C. at a temperature rise rate of 6° C./min and keeping the constant temperature 3,000° C. for 30 min.

The graphitized solid was subsequently cooled to 2,000° C. at the temperature fall rate of 5° C./min, and then naturally cooled to the room temperature to produce the carbon particulate ASC5, the electrode sheet made of ASC5 was labeled as ASD5, the button cell assembled with ASC5 was marked as ASK5, and the columnar battery assembled with ASC5 was denoted as ASZ5.

Example A6

The battery was prepared according to the same method as that in Example A1, except that: the carbon source was initially subjected to purification by using 6 vol % of HF solution, the carbon source and the HF solution were uniformly mixed according to the volume ratio of 1:12, and subjected to stirring for 40 min to form a mixture. After the mixture was separated, the solid was subjected to purification with 10 vol % of HCl solution, the solid and the HCl solution were uniformly blended according to the volume ratio of 1:5, and subjected to stirring for 40 min, the solid obtained by separation was subsequently baked for later use.

Comparative Example A1

The battery was prepared according to the same method as that in Example A1, except that the carbonization conditions in Comparative example A1 were different from those of Example A1. In particular, the first temperature rise stage was heating to 500° C. at a temperature rise rate of 15° C./min and keeping the constant temperature 500° C. for 30 min; the second temperature rise stage was raising temperature to 1,000° C. at a temperature rise rate of 10° C./min and keeping the constant temperature 1,000° C. for 20 min; the third temperature rise stage was raising temperature to 1,500° C. at a temperature rise rate of 15° C./min and keeping the constant temperature 1,500° C. for 30 min.

The carbon particulate produced with the method was marked as ADC1, the electrode sheet made of carbon particulate ADC1 was labeled as ADD1, the button cell assembled with the electrode sheet ADC1 was marked as ADK1, and the columnar battery assembled with the electrode sheet ADC1 was denoted as ADZ1.

Comparative Example A2

The battery was prepared according to the same method as that in Example A1, except that the metallurgical coke was selected as a carbon source; the carbon particulate produced with the method was marked as ADC2, the electrode sheet made of ADC2 was labeled as ADD2, the button cell assembled with ADC2 was marked as ADK2, and the columnar battery assembled with ADC2 was denoted as ADZ2.

Comparative Example A3

The battery was prepared according to the same method as that in Example A1, except that the mesocarbon microbead was selected as a carbon source; the carbon particulate produced with the method was marked as ADC3, the electrode sheet made of ADC3 was labeled as ADD3, the button cell assembled with ADC3 was marked as ADK3, and the columnar battery assembled with ADC3 was denoted as ADZ3.

Comparative Example A4

The battery was prepared according to the same method as that in Example A1, except that the carbon source was prepared according to the following process: the flake graphite was pulverized and spheroidized such that its average particle diameter D50 was 16 μm, then the flake graphite and the petroleum coke were subjected to stirring and blending according to the weight ratio of 9:1 to prepare the carbon source.

The carbon source was subjected to a carbonization treatment, the entire carbonization process comprised heating from the room temperature to 1,100° C. at a heating rate of 3° C./min and keeping the constant temperature 1,100° C. for 60 min; subsequently raising temperature to 1,500° C. at a heating rate of 2.5° C./min and keeping the constant temperature 1,500° C. for 60 min; then cooled to the room temperature to obtain the carbon particulate.

The carbon particulate produced with the method was marked as ADC4, the electrode sheet made of carbon particulate ADC4 was labeled as ADD4, the button cell assembled with ADC4 was marked as ADK4, and the columnar battery assembled with t ADC4 was denoted as ADZ4.

Comparative Example A5

The battery was prepared according to the same method as that in Example A6, except that:

The carbon source was initially subjected to purification by using 6 vol % of HF solution, the carbon source and the HF solution were uniformly mixed according to the volume ratio of 1:20, and subjected to stirring for 40 min to form a mixture. After the mixture was separated, the solid was subjected to purification with 10 vol % of HCl solution, the solid and the HCl solution were uniformly blended according to the volume ratio of 1:12, and subjected to stirring for 40 min, the solid obtained by separation was subsequently baked for later use.

The carbon particulate produced with the method was marked as ADC5, the electrode sheet made of ADC5 was labeled as ADD5, the button cell assembled with ADC5 was marked as ADK5, and the columnar battery assembled with ADC5 was denoted as ADZ5.

Comparative Example A6

The battery was prepared according to the same method as that in Example A1, except that:

The carbon source was subjected to purification by using 15 vol % of HF solution, the carbon source and the HF solution were uniformly mixed according to the volume ratio of 1:1.2, and subjected to stirring for 30 min to form a mixture. After the mixture was separated, the solid was subjected to rinsing with a deionized water, the solid obtained by separation was subsequently baked for later use.

The carbon particulate produced with the method was marked as ADC6, the electrode sheet made of ADC6 was labeled as ADD6, the button cell assembled with ADC6 was marked as ADK6, and the columnar battery assembled with ADC6 was denoted as ADZ6.

Comparative Example A7

The battery was prepared according to the same method as that in Example A1, except that:

The carbonized solid was subjected to a graphitization treatment, and the entire graphitization treatment process included the following steps: heating to 1,900° C. at a temperature rise rate of 10° C./min and keeping the constant temperature 1,900° C. for 20 min; further heating to 2,800° C. at a temperature rise rate of 15° C./min and keeping the constant temperature 2,800° C. for 20 min.

The graphitized solid was cooled to 2,000° C. at a temperature fall rate of 5° C./min, subsequently naturally cooled to the room temperature to produce the carbon particulate ADC7, the electrode sheet made of ADC7 was labeled as ADD7, the button cell assembled with ADC7 was marked as ADK7, and the columnar battery assembled with ADC7 was denoted as ADZ7.

The carbon particulates prepared in the above Examples were subjected to structural characterization, and the specific characterization results were shown in Table 3; the carbon particulates prepared in the above Comparative Examples were subjected to structural characterization, and the specific characterization results were shown in Table 3 (continued).

TABLE 3

| Test items | | ASC0 | ASC1 | ASC2 | ASC3 | ASC4 | ASC5 | ASC6 |
|---|---|---|---|---|---|---|---|---|
| BET specific surface area (m²/g) | | 24.7 | 1.14 | 1.28 | 0.98 | 1.19 | 1.94 | 1.25 |
| Based on the total pore volume of the pore diameters of 2-200 nm measured by BJH | The ratio of the total pore volumes of the pore diameters of 2-10 nm/% | 38.84 | 4 | 6 | 5 | 3 | 5 | 4.5 |
| | The ratio of the total pore volumes of t the pore diameters of 10-100 nm/% | 47.63 | 31.7 | 40 | 35.5 | 45 | 30 | 35.8 |
| | The ratio of the total pore volumes of the pore diameters of 100-200 nm/% | 13.53 | 64.3 | 54 | 59.5 | 52 | 65 | 59.7 |
| d(002)/nm | | 0.34 | 0.336 | 0.336 | 0.3359 | 0.336 | 0.336 | 0.336 |
| Lc/nm | | 1.425 | 0.679 | 0.679 | 0.677 | 0.679 | 0.679 | 0.679 |
| Graphitization degree/% | | 46.5 | 85.18 | 88.8 | 90.6 | 93.1 | 90.2 | 85.18 |
| $I_{(002)}/I_{(100)}$ | | — | 184.6 | 198.4 | 245.7 | 242.5 | 261.7 | 185.9 |
| $I_{(002)}/I_{(101)}$ | | — | 128.4 | 205.7 | 209.6 | 162.4 | 185.4 | 213.5 |
| $I_{(002)}/I_{(004)}$ | | — | 33.2 | 32.8 | 28.7 | 31.2 | 26.7 | 34.5 |

TABLE 3-continued

| | | | | | | | | |
|---|---|---|---|---|---|---|---|---|
| $I_{(004)}/I_{(110)}$ | | — | 4.85 | 6.75 | 6.12 | 4.57 | 5.18 | 5.68 |
| D peak measured by Raman/cm$^{-1}$ | | 1317 | 1356 | 1380 | 1,350 | 1324 | 1396 | 1346 |
| G peak measured by Raman/cm$^{-1}$ | | 1592 | 1580 | 1562 | 1,600 | 1560 | 1597 | 1592 |
| $I_D/I_G$ | | 0.65 | 0.1 | 0.14 | 0.2 | 0.11 | 0.12 | 0.14 |
| Granularity distribution | D10/μm | 51.7 | 3.7 | 2.8 | 4.2 | 3.2 | 1.4 | 4.0 |
| | D50/μm | 270.7 | 13.54 | 16.3 | 15.4 | 12.4 | 17.5 | 14.8 |
| | D90/μm | 643.4 | 26.2 | 30.7 | 32.5 | 25.5 | 34.6 | 28.4 |
| Thermogravimetric test | Ratio of mass loss under the temperature 400-650° C. relative to the weight % | — | 89.5 | 88.7 | 89.9 | 84.7 | 88.5 | 89.2 |
| Tap density (g/cm$^3$) | | — | 1.1 | 1.13 | 1.2 | 1.2 | 1.04 | 1.05 |

| Test items | | ADC1 | ADC2 | ADC3 | ADC4 | ADC5 | ADC6 | ADC7 |
|---|---|---|---|---|---|---|---|---|
| BET specific surface area (m$^2$/g) | | 2.39 | 5.59 | 1.6 | 1.45 | 1.62 | 1.70 | 1.65 |
| Based on the total pore volume of the pore diameters of 2-200 nm measured by BJH | The ratio of the total pore volumes of the pore diameters of 2-10 nm/% | 3.4 | 1.24 | 2.9 | 1.6 | 20.4 | 16.3 | 31.5 |
| | The ratio of the total pore volumes of the pore diameters of 10-100 nm/% | 46.2 | 20.58 | 32.6 | 10.2 | 62.1 | 18.5 | 34.2 |
| | The ratio of the total pore volumes of the pore diameters of 100-200 nm /% | 50.4 | 78.18 | 64.5 | 88.2 | 17.5 | 65.2 | 34.3 |
| d(002)/nm | | 0.336 | 0.337 | 0.3357 | 0.337 | 0.336 | 0.336 | 0.336 |
| Lc/nm | | 0.679 | 0.682 | — | — | — | — | — |
| Graphitization degree/% | | 94.18 | 81.4 | — | — | — | — | — |
| $I_{(002)}/I_{(100)}$ | | 141.5 | 138.5 | — | — | — | — | — |
| $I_{(002)}/I_{(101)}$ | | 112.1 | 110.9 | — | — | — | — | — |
| $I_{(002)}/I_{(004)}$ | | 36.2 | 37.4 | — | — | — | — | — |
| $I_{(004)}/I_{(110)}$ | | 3.15 | 4.26 | — | — | — | — | — |
| D peak measured by Raman/cm$^{-1}$ | | 1362 | 1370 | — | — | — | — | — |
| G peak measured by Raman/cm$^{-1}$ | | 1586 | 1594 | — | — | — | — | — |
| $I_D/I_G$ | | 0.102 | 0.121 | — | — | — | — | — |
| Granularity distribution | D10/μm | 7.92 | 8.21 | 5.12 | 6.45 | 9.2 | 9.3 | 7.9 |
| | D50/μm | 16.12 | 18.35 | 10.5 | 16.24 | 18.33 | 18.95 | 15.2 |
| | D90/μm | 28.49 | 30.47 | 19.6 | 24.5 | 26.4 | 30.5 | 29.8 |
| Thermogravimetric test | Ratio of mass loss under the temperature 400-650° C. relative to the weight % | 88.6 | 89.2 | 89.5 | 86.4 | 80.3 | 83.7 | 87.4 |
| Tap density (g/cm$^3$) | | 1.23 | 1.46 | 0.99 | 1.12 | 1.12 | 1.05 | 1.08 |

The button cells and the columnar batteries prepared in each of the above Examples and Comparative Examples were subjected to performance measurement, and the specific measurement results were illustrated in Table 4.

TABLE 4

| | Test items | ASK1 | ASK2 | ASK3 | ASK4 | ASK5 | ASK6 |
|---|---|---|---|---|---|---|---|
| Button Cell | Charge capacity/ mAh · g$^{-1}$ | 371 | 370 | 366 | 369 | 368 | 365 |
| | Discharge capacity/ mAh · g$^{-1}$ | 367 | 366 | 361 | 365 | 363 | 358 |
| | Coulombic efficiency/% | 95 | 94.87 | 93.01 | 94 | 93.02 | 93.2 |
| | 0.1 C specific discharge capacity mAh · g$^{-1}$ | 362.5 | 361.5 | 355.6 | 360.5 | 357.8 | 352.6 |
| | 2 C specific discharge capacity mAh · g$^{-1}$ | 357.5 | 357.5 | 352 | 354.2 | 354.2 | 347.3 |
| 18650 columnar battery | 0.2 C discharge capacity/mAh | 2179.1 | 2180.5 | 2154 | 2123.5 | 2127.7 | 2167.4 |
| | 0.2 C first coulombic efficiency/% | 94 | 93.8 | 92.3 | 93.5 | 92.5 | 92.8 |
| | Internal resistance of battery/mΩ | 27 | 28.3 | 28 | 27.5 | 28 | 27.5 |
| | Voltage value of battery/V | 4.1 | 4.1 | 4.1 | 4.1 | 4.1 | 4.1 |
| | 0.5 C discharge capacity/mAh | 2178.9 | 2180.7 | 2154.1 | 2122.5 | 2127.3 | 2167.1 |
| | 1 C discharge capacity/mAh | 2168 | 2169.7 | 2143.3 | 2111.9 | 2116.7 | 2156.3 |

TABLE 4-continued

| | Test items | ADK1 | ADK2 | ADK3 | ADK4 | ADK5 | ADK6 | ADK7 |
|---|---|---|---|---|---|---|---|---|
| Button Cell | Charge capacity/ mAh · g$^{-1}$ | 333.9 | 331.5 | 339.6 | 324.5 | 332.9 | 335.9 | 368.4 |
| | Discharge capacity/ mAh · g$^{-1}$ | 316.8 | 311.7 | 317.4 | 302.4 | 312 | 312.4 | 345.8 |
| | Coulombic efficiency/ % | 94.9 | 94 | 93.4 | 93.2 | 93.7 | 93 | 93.8 |
| | 0.1 C specific discharge capacity mAh · g$^{-1}$ | 319.9 | 315.9 | 321.4 | 302.4 | 309.5 | 302 | 314.2 |
| | 2C specific discharge capacity mAh · g$^{-1}$ | 40.5 | 32.7 | 34.4 | 31.4 | 30.8 | 30.5 | 30.1 |
| 18650 columnar battery | 0.2 C discharge capacity/mAh | 2083.1 | 2045.7 | 2064.5 | 2024.3 | 2015.3 | 2046.1 | 2089.1 |
| | 0.2 C first coulombic efficiency/% | 88.1 | 87.5 | 86.7 | 85.42 | 85.9 | 86.1 | 85.6 |
| | Internal resistance of battery/mΩ | 29.6 | 30.2 | 29.8 | 30.1 | 29 | 29.4 | 29.5 |
| | Voltage value of battery/V | 4.1 | 4.1 | 4.1 | 4.1 | 4.1 | 4.1 | 4.1 |
| | 0.5 C discharge capacity/mAh | 2051.2 | 2086.4 | 2054.7 | 2006.5 | 1994.5 | 1998.4 | 2013 |
| | 1 C discharge capacity/mAh | 2002.1 | 1992.3 | 2012.5 | 1985.4 | 1987.3 | 1986.7 | 2002.3 |

As illustrated by the data in Table 3 and Table 4, the carbon particulate in the second preferred embodiment prepared with the method of the present disclosure has a specific surface area within a range of 0.98-1.94 m$^2$/g, and the pores having the pore diameters of 100-200 nm account for more than 50% of the total pore volume of the pore diameters of 2-200 nm. When the carbon particulates prepared in each of the Example are assembled into a button cell, the button cell has a charge capacity within a range of 365-371.6 mAh/g, a discharge capacity within a range of 358-367 mAh/g, and the coulomb efficiency up to 94-97%; in addition, the columnar battery formed by assembling of the carbon particulate has the discharge capacity at 0.5 C rate which can still be kept at 2,122-2,181 mAh, and the discharge capacity at 0.5 C rate can be kept at 2,111-2,170 mAh.

As shown in the Comparative Example A5 and the Comparative Example A7, the coulombic efficiency of the button cells assembled and formed therein is slightly reduced, and the high temperature property of the columnar batteries assembled therein is degraded, when the total pore volumes of 2-10 nm pores accounts for nearly 50% of the total pore volume of the pore diameters of 2-200 nm. As demonstrated in the Comparative Example 6, when the total pore volumes of 2-10 nm pores accounts for a small portion of the total pore volume of the pore diameters of 2-200 nm, both the coulombic efficiency and the high temperature property of the button cells produced with the carbon particulate are degraded. As shown in the Comparative Examples A1-A4, when the carbonization temperature rise rate is excessively rapid or other raw material is used as the carbon source, both the coulombic efficiency and the high temperature property of the produced lithium-ion batteries are slightly degraded. Therefore, when the carbon particulate in the second preferred embodiment prepared with the method of the present disclosure is used as the lithium-ion battery anode, the coulombic efficiency and the high temperature property of the lithium-ion battery can be effectively improved, and a relatively reasonable rate performance can be maintained as well.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A lithium-ion battery anode carbon particulate, wherein in pore structure measured by $N_2$ adsorption and desorption of the carbon particulate, the ratio of the total pore volumes of the pore diameters of 2-10 nm is 5-10%, the ratio of the total pore volumes of the pore diameters of 10-100 nm is 50-65%, and the ratio of the total pore volumes of the pore diameters of 100-200 nm is 30-40%, based on the total pore volume measured by BJH of the pore diameters of 2-200 nm; the carbon particulate has a BET specific surface area within a range of 1-4 m$^2$/g,
wherein the carbon particulate has an interlayer spacing d(002) measured by X-ray diffraction being 0.3368 nm or less, a crystallite size Lc in a C-axis direction within a range of 0.5-0.9 nm, and a graphitization degree of 84-93%.

2. The lithium-ion battery anode carbon particulate of claim 1, wherein the carbon particulate has a D peak measured by Raman within a range of 1,300-1,400 cm$^{-1}$, and a G peak within a range of 1,550-1,600 cm$^{-1}$; $I_D/I_G$<0.1.

3. The lithium-ion battery anode carbon particulate of claim 1, wherein the carbon particulate has a granularity distribution D10 within a range of 1-5 μm, D50 within a range of 12-18 μm, and D90 within a range of 25-35 μm.

4. The lithium-ion battery anode carbon particulate of claim 3, wherein the carbon particulate has a maximum particle diameter of 39 μm.

5. The lithium-ion battery anode carbon particulate of claim 1, wherein the carbon particulate has a mass loss of 80-90 wt % under the temperature 400-650° C. when subjecting to a thermogravimetric test.

6. The lithium-ion battery anode carbon particulate of claim 1, wherein the carbon particulate has a tap density within a range of 0.9-1.2 g/cm$^3$.

7. A lithium-ion battery anode comprising the lithium-ion battery anode carbon particulate of claim 1.

8. A lithium-ion battery comprising the lithium-ion battery anode of claim 7, a cathode and an electrolyte, wherein the cathode and the anode are separated by a separator; the cathode, the anode and the separator are immersed in the electrolyte.

9. A lithium-ion battery anode of claim 7, wherein the lithium-ion battery anode further comprises a conductive agent, a weight ratio of the carbon particulate to the conductive agent is 1:0.05-0.125.

10. The lithium-ion battery anode carbon particulate of claim 1, wherein the carbon particulate has a BET specific surface area within a range of 1.4-1.9 m$^2$/g.

11. The lithium-ion battery anode carbon particulate of claim 1, wherein the carbon particulate has a ratio of $I_{(002)}/I_{(100)}$ measured by X-ray diffraction within a range of 180-300, a ratio of $I_{(002)}/I_{(101)}$ within a range of 120240, a ratio of $I_{(002)}/I_{(004)}$ within a range of 25-35, and a ratio of $I_{(004)}/I_{(110)}$ within a range of 4-10.

12. The lithium-ion battery anode carbon particulate of claim 11, wherein the carbon particulate has a D peak measured by Raman within a range of 1,300-1,350 cm$^{-1}$, $I^D/I_G$=0.01-0.084.

13. The lithium-ion battery anode carbon particulate of claim 12, wherein $I_D/I_G$=0.01-0.066.

14. The lithium-ion battery anode of claim 9, wherein the lithium-ion battery anode further comprises an aqueous binder, a weight ratio of the carbon particulate to the aqueous binder is 1:0.01-0.06.

15. The lithium-ion battery anode of claim 9, wherein the conductive agent is at least one selected from the group consisting of conductive carbon black, graphite, graphene and carbon nanotube.

16. The lithium-ion battery anode of claim 14, wherein the aqueous binder is at least one selected from the group consisting of polyvinylidene fluoride, carboxylic butadiene-styrene latex, styrene-butadiene rubber, polyvinyl alcohol, sodium carboxymethylcellulose and polytetrafluoroethylene.

* * * * *